(12) United States Patent
Tsujimoto

(10) Patent No.: US 11,597,619 B2
(45) Date of Patent: Mar. 7, 2023

(54) SHEET SUPPLY DEVICE AND SHEET SUPPLY METHOD

(71) Applicant: ZUIKO CORPORATION, Osaka (JP)

(72) Inventor: Yoshiaki Tsujimoto, Osaka (JP)

(73) Assignee: ZUIKO CORPORATION, Osaka (JP)

( * ) Notice: Subject to any disclaimer, the term of this patent is extended or adjusted under 35 U.S.C. 154(b) by 0 days.

(21) Appl. No.: 16/767,042

(22) PCT Filed: Nov. 29, 2018

(86) PCT No.: PCT/JP2018/043905
§ 371 (c)(1),
(2) Date: May 26, 2020

(87) PCT Pub. No.: WO2019/107473
PCT Pub. Date: Jun. 6, 2019

(65) Prior Publication Data
US 2021/0009373 A1   Jan. 14, 2021

(30) Foreign Application Priority Data

Nov. 30, 2017   (JP) .............................. JP2017-231158

(51) Int. Cl.
*B29C 65/00* (2006.01)
*B65H 19/18* (2006.01)
(Continued)

(52) U.S. Cl.
CPC .......... *B65H 19/1805* (2013.01); *B29C 65/74* (2013.01); *B29C 65/741* (2013.01); *B29C 65/80* (2013.01)

(58) Field of Classification Search
CPC ....... B29C 65/74; B29C 65/741; B29C 65/80; B65H 19/1805
See application file for complete search history.

(56) References Cited

U.S. PATENT DOCUMENTS

2003/0126970 A1   7/2003   Kansaku et al.
2003/0178523 A1   9/2003   Trutschel

FOREIGN PATENT DOCUMENTS

CN   205590053   9/2016
CN   106868734   6/2017
(Continued)

OTHER PUBLICATIONS

English translation of the specification of JP 2009/143706A (Year: 2009).*
(Continued)

*Primary Examiner* — George R Koch
*Assistant Examiner* — Nickolas R Harm
(74) *Attorney, Agent, or Firm* — Wenderoth, Lind & Ponack, L.L.P.

(57) ABSTRACT

A sheet supply device and a sheet supply method include a guide roller disposed at an opposite side of a standby side roll with respect to a tangential line to an outer peripheral surface of the standby side roll at a pressing position in a state in which a pressing roller is pressed against a pressing position, and configured to guide a sheet from the pressing roller in a direction away from the standby side roll. Furthermore, the second guide roller is fixed to a moving unit so as to be configured to approach and move away from the standby side roll together with the pressing roller.

5 Claims, 23 Drawing Sheets

(51) Int. Cl.
    *B29C 65/74*    (2006.01)
    *B29C 65/80*    (2006.01)

(56)            References Cited

FOREIGN PATENT DOCUMENTS

| JP | 2-18447 | 2/1990 |
| JP | 2001-163487 | 6/2001 |
| JP | 2003-118895 | 4/2003 |
| JP | 2005-289640 | 10/2005 |
| JP | 2006-188348 | 7/2006 |
| JP | 2009-143706 | 7/2009 |
| WO | 2004/080868 | 9/2004 |
| WO | 2012/110682 | 8/2012 |

OTHER PUBLICATIONS

English translation of the specification of JP 2006/188348A (Year: 2006).*
Notice of Reasons for Refusal dated Apr. 21, 2021 in Japanese Application No. 2019-557308, with English translation.
Office Action dated Mar. 3, 2021 in Chinese Application No. 201880076157.9 with partial English translation.
International Search Report dated Feb. 19, 2019 in International (PCT) Application No. PCT/JP2018/043905.
Extended European Search Report dated Feb. 11, 2022 in European Application No. 18884622.4.

* cited by examiner

SHEET SUPPLY DEVICE AND SHEET SUPPLY METHOD

TECHNICAL FIELD

The present invention relates to a sheet supply device for continuously supplying a sheet from a roll around which the sheet is wound.

BACKGROUND ART

Conventionally, for example, an unwinding device described in Patent Literature 1 has been known.

The unwinding device has a first chucking device that holds a first winding roll, a second chucking device that holds a second winding roll, an automatic sheet joining device that joins a sheet of the second winding roll to a sheet of the first winding roll when a remaining quantity of the sheet of the first winding roll is equal to or less than a preset remaining quantity, and a guide roller that guides the sheet drawn from the first winding roll.

The automatic sheet joining device includes a lifting/lowering pressure roll that presses a middle part of the sheet between the first winding roll and the guide roller against a preset pressing position on an outer peripheral surface of the second winding roll, and a guide column that elevatably supports the lifting/lowering pressure roll.

The guide roller is disposed on an opposite side of the second winding roll with respect to a tangential line to the outer peripheral surface of the second winding roll at the pressing position in the state in which the lifting/lowering pressure roll (sheet of the first winding roll) is pressed against the pressing position of the second winding roll, and guides the sheet such that the sheet is guided from the lifting/lowering pressure roll in a direction away from the second winding roll. Thereby, an end portion of the sheet of the second winding roll joined to the first winding roll is guided so as to be separated from the outer peripheral surface of the second winding roll with the conveyance of the first winding roll.

Hereinafter, a sheet joining operation by the unwinding device described in Patent Literature 1 will be described.

When the remaining quantity of the sheet of first winding roll is equal to or less than the preset remaining quantity, the lifting/lowering pressure roll disposed below the sheet between the first winding roll and the guide roller is raised. Thereby, the middle part of the sheet of the first winding roll is lifted and pressed against the outer peripheral surface (pressing position) of the second winding roll. The end portion of the sheet of the second winding roll is held on the outer peripheral surface of the second winding roll by a holding member such as a double-sided tape such that the end portion of the sheet of the second winding roll does not deviate from the outer peripheral surface due to an action of gravity or a centrifugal force at the time of pre-rotation. Further, the adhesion member such as the double-sided tape is provided at the end portion of the sheet held on the outer peripheral surface, and the sheet of the first winding roll is bonded to the end portion of the sheet of the second winding roll via the adhesion member by the pressing operation. In this state, since the sheet of the first winding roll is guided from the lifting/lowering pressure roll toward the guide roller in the direction away from the second winding roll, the end portion of the sheet of the second winding roll joined to the sheet of the first winding roll is separated from the outer peripheral surface of the second winding roll by a take-up force of the sheet against a holding force of the holding member. Therefore, by cutting the sheet of the first winding roll in this state, the supply of the sheet of the second winding roll can be started without stopping the supply of the sheet of the first winding roll.

However, in the unwinding device of Patent Literature 1, the guide roller is fixed to the guide post, that is, the lifting/lowering pressure roll is moved relatively to the guide roller.

Therefore, when the pressing position is changed due to a difference in a diameter dimension of the second winding roll that is not joined to the sheet of the first winding roll, an angle (hereinafter, referred to as a separating angle) of the sheet guided from the pressing position to the guide roller with respect to the tangential line of the outer peripheral surface of the second winding roll at the pressing position is changed.

Specifically, when the diameter of the second winding roll is increased, the separating angle is decreased, and when the diameter of the second winding roll is decreased, the separating angle is increased.

As described above, in the unwinding device described in Patent Literature 1, when the separating angle is changed according to the difference in the diameter dimension of the second winding roll, a component force in a centrifugal direction of the second winding roll in the take-up force of the sheet of the first winding roll is changed, and therefore precision of an operation of separating the end portion of the sheet of the second winding roll from the outer peripheral surface of the second winding roll is changed.

CITATION LIST

Patent Literature

Patent Literature 1: JP 2003-118895 A

SUMMARY OF INVENTION

An object of the present invention is to provide a sheet supply device and a sheet supply method capable of keeping the precision of a sheet separating operation constant regardless of differences in diameter dimensions of rolls.

In order to solve the above problems, the present invention provides a sheet supply device for supplying a sheet from a first roll and a second roll around which the sheet is wound, the sheet supply device including: a first support shaft that supports the first roll at a center position thereof; a second support shaft that supports the second roll at a center position thereof; a joining mechanism that joins the sheet of the second roll to the sheet of the first roll when a remaining quantity of the sheet of the first roll is equal to or less than a preset remaining quantity in a state in which the sheet of the first roll is supplied; and a guide roller that guides the sheet drawn from the first roll, in which the joining mechanism includes a pressing roller that presses a middle part of the sheet between the first roll and the guide roller against a preset pressing position on an outer peripheral surface of the second roll, and a moving unit that supports the pressing roller such that the pressing roller is configured to approach and move away from the outer peripheral surface of the second roll between a forward position where the pressing roller is pressed against the pressing position and a retracted position where the pressing roller is away from the pressing position, the guide roller is disposed on an opposite side of the second roll with respect to a tangential line to the outer peripheral surface of the second roll at the pressing position in a state in which the pressing roller is pressed against the pressing position of the second roll, and guides the sheet such that the sheet is guided from the pressing roller in a direction away from the second roll, and furthermore is fixed to the moving unit so as to be configured to approach and move away from the second roll together with the pressing roller.

In addition, the present invention provides a sheet supply method for supplying a sheet from a first roll and a second roll around which the sheet is wound, the sheet supply method including: a first supply step of supplying the sheet of the first roll supported at a center position by a first support shaft; and a joining step of joining the sheet of the second roll to the sheet of the first roll using a joining mechanism that joins the sheet of the second roll to the sheet of the first roll when a remaining quantity of the sheet of the first roll is equal to or less than a preset remaining quantity in a state in which the sheet of the first roll is supplied, in which the joining mechanism includes a pressing roller that presses a middle part of the sheet between a guide roller for guiding the sheet drawn from the first roll and the first roll against a preset pressing position on an outer peripheral surface of the second roll, and a moving unit that supports the pressing roller such that the pressing roller is configured to approach and move away from the outer peripheral surface of the second roll between a forward position where the press roller is pressed against the pressing position and a retracted position where the press roller is away from the pressing position, and in the joining step, by moving the moving unit in a direction approaching the second roll, the sheet is guided such that the sheet is guided from the pressing roller in a direction away from the second roll by pressing the pressing roller against the pressing position and disposing the guide roller fixed to the moving unit on an opposite side of the second roll with respect to a tangential line to the outer peripheral surface of the second roll at the pressing position.

According to the present invention, it is possible to keep the precision of the sheet separating operation constant regardless of the differences in the diameter dimensions of the rolls.

DESCRIPTION OF EMBODIMENTS

Hereinafter, embodiments of the present invention will be described with reference to the accompanying drawings. The following embodiments are specific examples of the present invention and do not limit the technical scope of the present invention.

Figure 1:
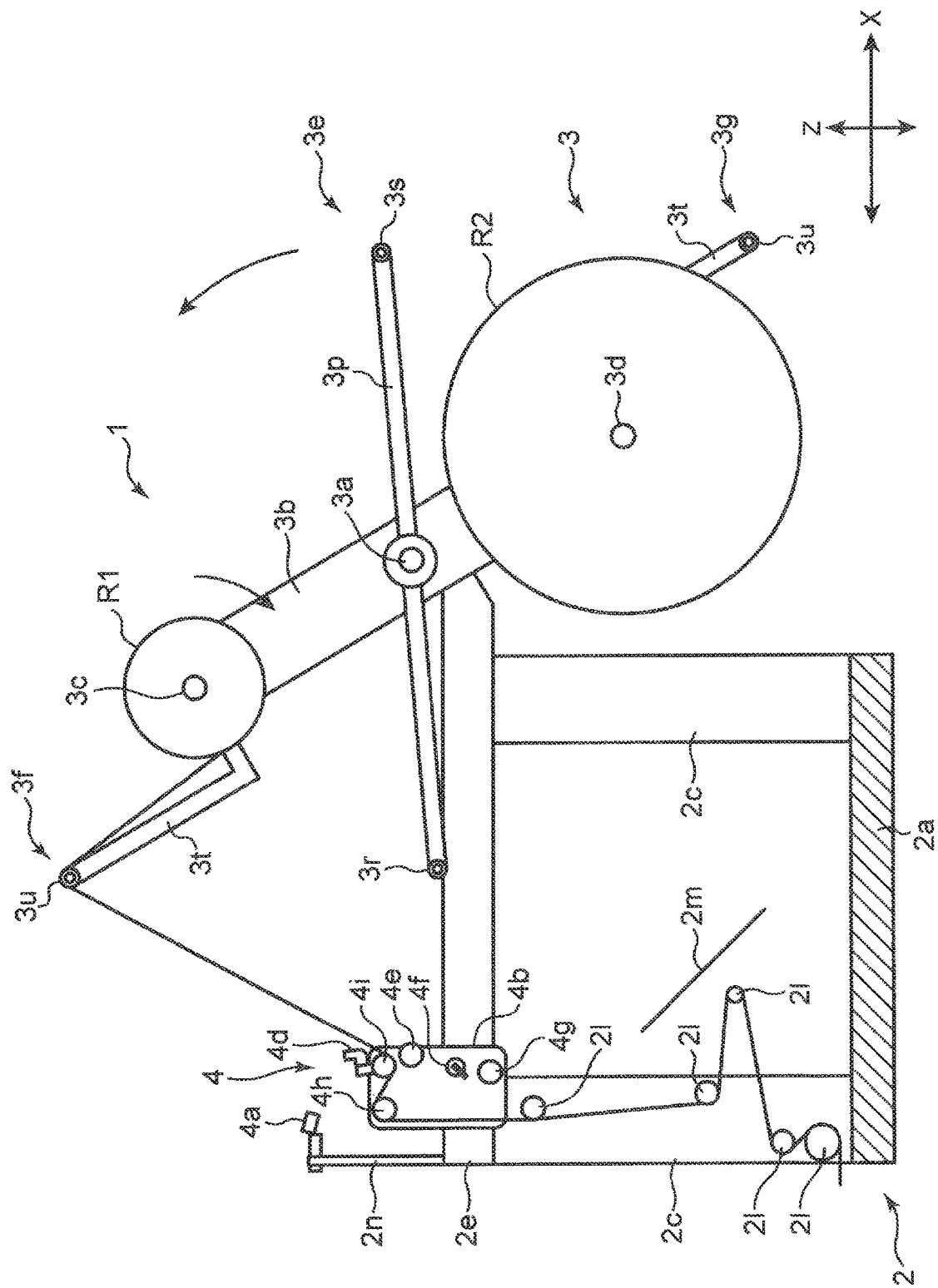
FIG. 1 is a partial front cross-sectional view of a sheet supply device 1 according to an embodiment of the present invention.
Figure 2:
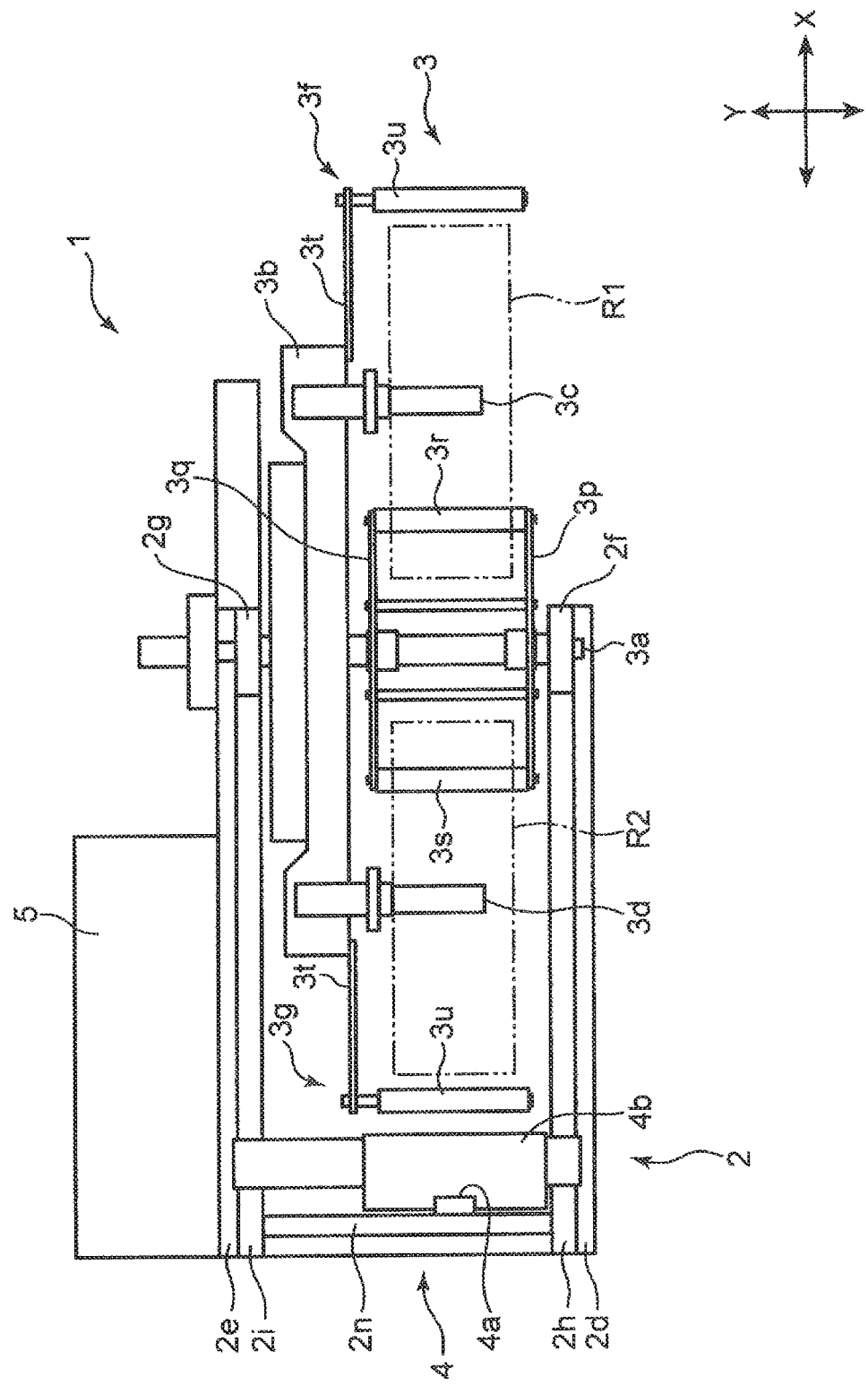
FIG. 2 is a plan view of the sheet supply device 1 of FIG. 1.
Figure 3:
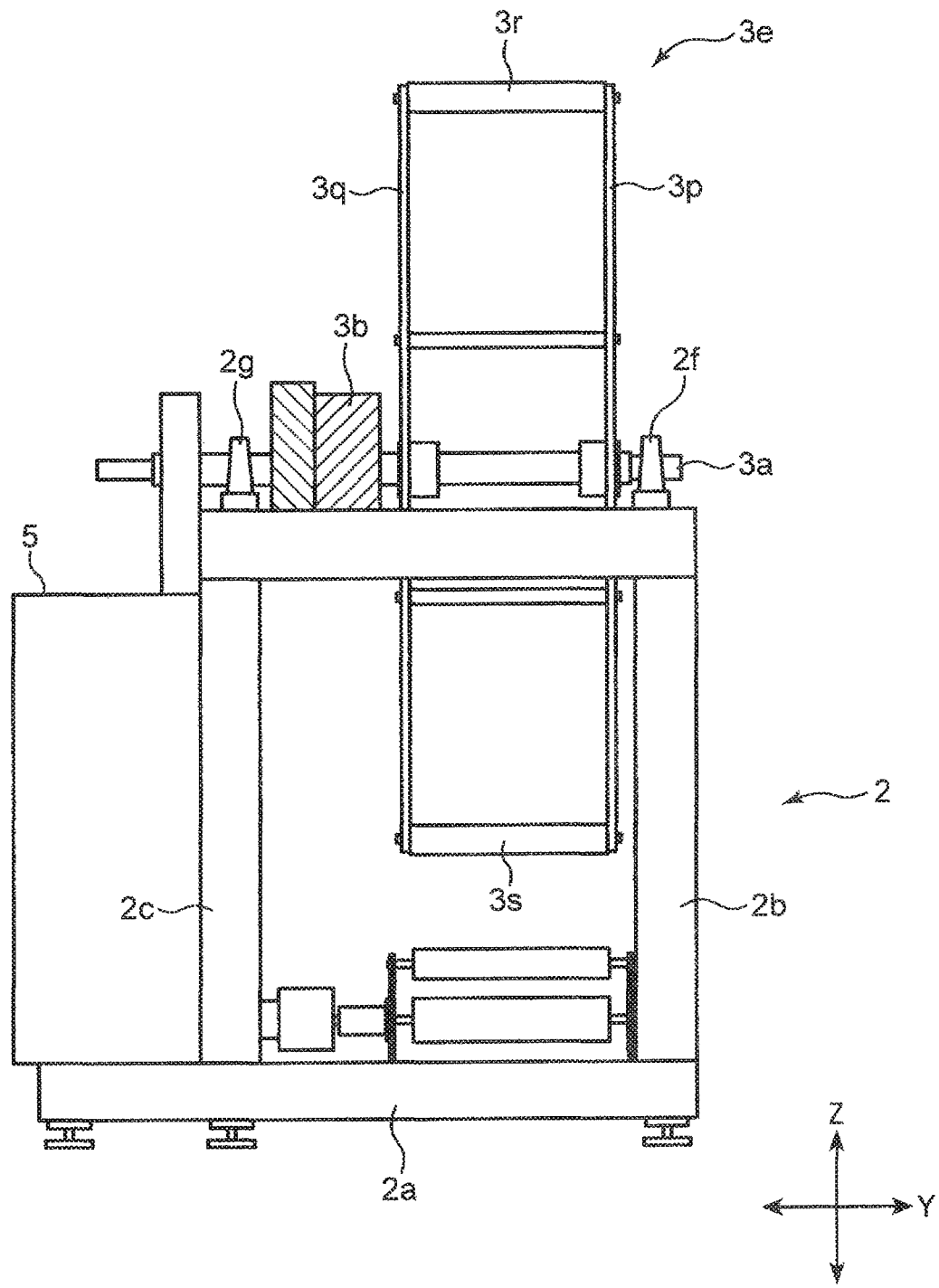
FIG. 3 is a side view of the sheet supply device 1 of FIG. 1.
Figure 4:
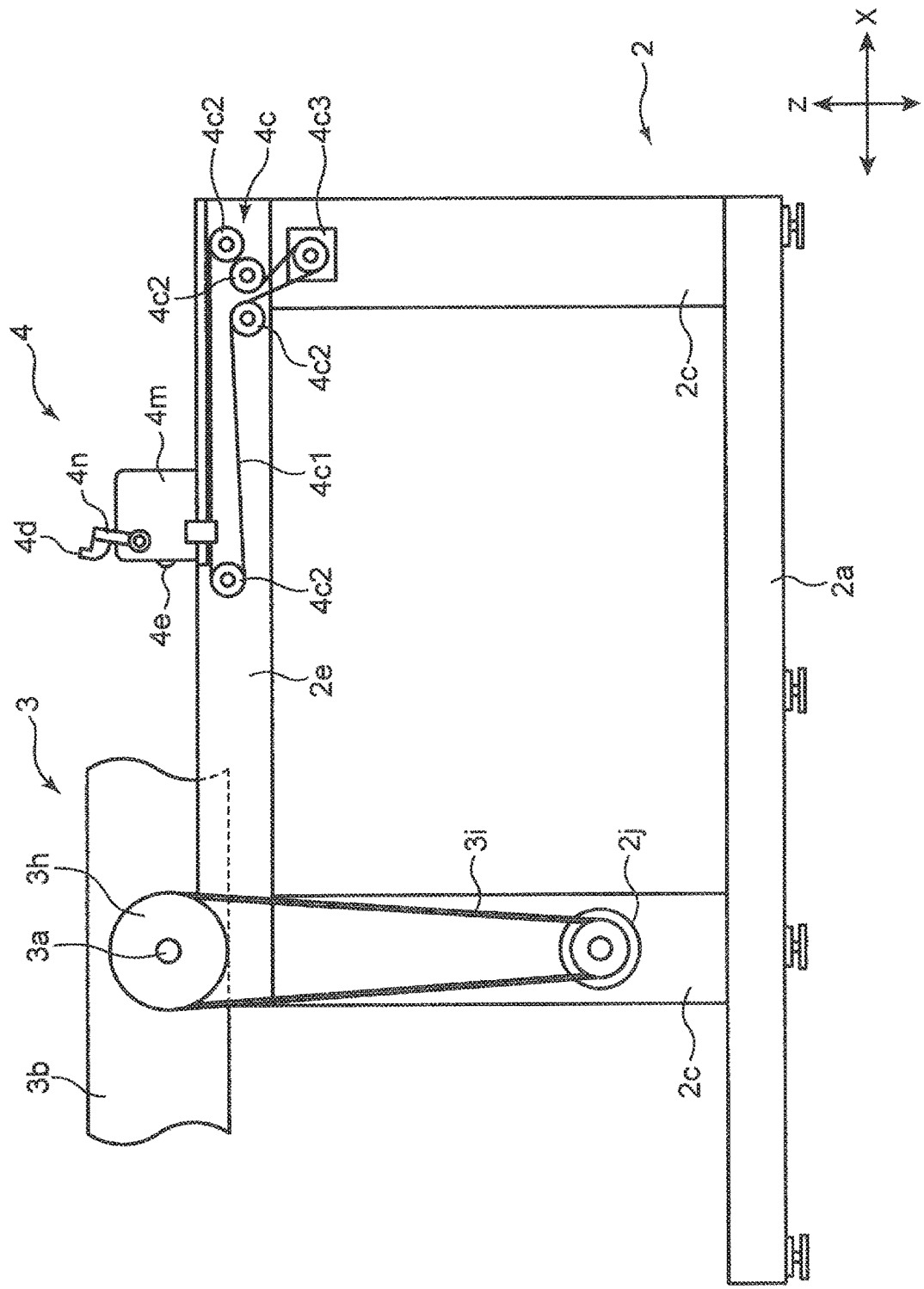
FIG. 4 is a rear view of the sheet supply device 1 of FIG. 1.

FIG. 1 is a partial front cross-sectional view of a sheet supply device 1 according to an embodiment of the present invention. FIG. 2 is a plan view of the sheet supply device 1 of FIG. 1. FIG. 3 is a side view of the sheet supply device 1 of FIG. 1. FIG. 4 is a rear view of the sheet supply device 1 of FIG. 1. Hereinafter, a horizontal direction in FIG. 1 will be described as an X direction, a vertical direction in FIG. 1 will be described as a Z direction, and a direction orthogonal to the X direction and the Z direction will be described as a Y direction.

Referring to FIGS. 1 to 3, the sheet supply device 1 is for supplying sheets from rolls R1 and R2 around which the sheets are wound.

Specifically, the sheet supply device 1 includes a base 2, a support mechanism 3 that supports the rolls R1, R2 while being attached to the base 2, a joining mechanism 4 that joins one sheet of one of the rolls R1 and R2 supported by the support mechanism 3 to the other sheet while being attached to the base 2, and a controller 5 that controls an operation of the support mechanism 3 and the joining mechanism 4.

The base 2 includes a mounting plate 2a mounted on a predetermined mounting surface, two columns 2b that stands on the mounting plate 2a so as to face each other in the X direction, two columns 2c that faces each other in the X direction at a position away from the two columns 2b in the Y direction, a beam 2d that extends in the X direction while being fixed to upper end portions of the two columns 2b, a beam 2e that extends in the X direction while being fixed to upper end portions of the two columns 2c, shaft support parts 2f and 2g (see FIG. 3) that stand on the beams 2d and 2e, respectively, and two rails 2h and 2i that extend in the X direction on the beams 2d and 2e. FIG. 1 is a partial front cross-sectional view in a state in which a part of the mounting plate 2a is cut away such that the illustration of the two columns 2b and the beams 2d are omitted.

The shaft support parts 2f and 2g face each other in the Y direction on one side (right side in FIG. 1) of the beams 2d and 2e in the X direction, while the rails 2h and 2i face each other in the Y direction on the other side (left side in FIG. 1) of the beams 2d and 2e in the X direction.

The support mechanism 3 is attached to the shaft support parts 2f and 2g of the base 2 so as to be rotatable about a rotation shaft 3a extending in the Y direction.

Specifically, the support mechanism 3 includes a rotation member 3b that is rotatably attached to the base 2 about the rotation shaft 3a, support shafts 3c and 3d that support the rolls R1 and R2 at center positions thereof, respectively, while being provided on the rotation member 3b, a rotating guide member 3e that is rotatably attached to the base 2 about the rotation shaft 3a together with the rotation member 3b, and adjacent guide members 3f and 3g that are provided adjacent to the support shafts 3c and 3d, respectively. The base 2 and the support mechanism 3 described above constitute a shaft support unit that supports the support shafts 3c and 3d.

The rotation member 3b extends between the beams 2d and 2e of the base 2 in a direction orthogonal to the rotation shaft 3a. In FIGS. 3 and 4, a part of the rotation member 3b is omitted.

The support shafts 3c and 3d are provided at positions away from the rotation shaft 3a in the rotation member 3b in a direction orthogonal to the rotation shaft 3a. Specifically, the support shaft 3c is provided at one end portion of the rotation shaft 3a in the rotation member 3b, while the support shaft 3d is provided at the other end portion of the rotation shaft 3a in the rotation member 3b. In addition, the support shafts 3c and 3d extend from the rotation member 3b to one side (beam 2d side) in the Y direction. As described above, the support shafts 3c and 3d are supported in a cantilever manner with respect to the rotation member 3b. Therefore, a worker can easily mount the rolls R1, R2 from near sides of free ends of the support shafts 3c and 3d such that the free ends of the support shafts 3c and 3d are inserted into centers of the rolls R1, R2.

Here, the rotation member 3b is rotatably supported by the base 2 between a state in which one of the support shafts 3c and 3d is disposed at a mounting position and a state in which the one of the support shafts 3c and 3d is disposed at a splice position. Hereinafter, the mounting position and the splice position will be described.

<Mounting Position>

In the state in which a sheet is supplied from the roll R1 supported by one (support shaft 3c in FIG. 1) of the support shafts 3c and 3d, the rotation member 3b is rotated in a state in which the other support shaft 3d is disposed at the mounting position (position shown in FIG. 1) for mounting a new roll on the other support shaft 3d.

<Splice Position>

Figure 10:
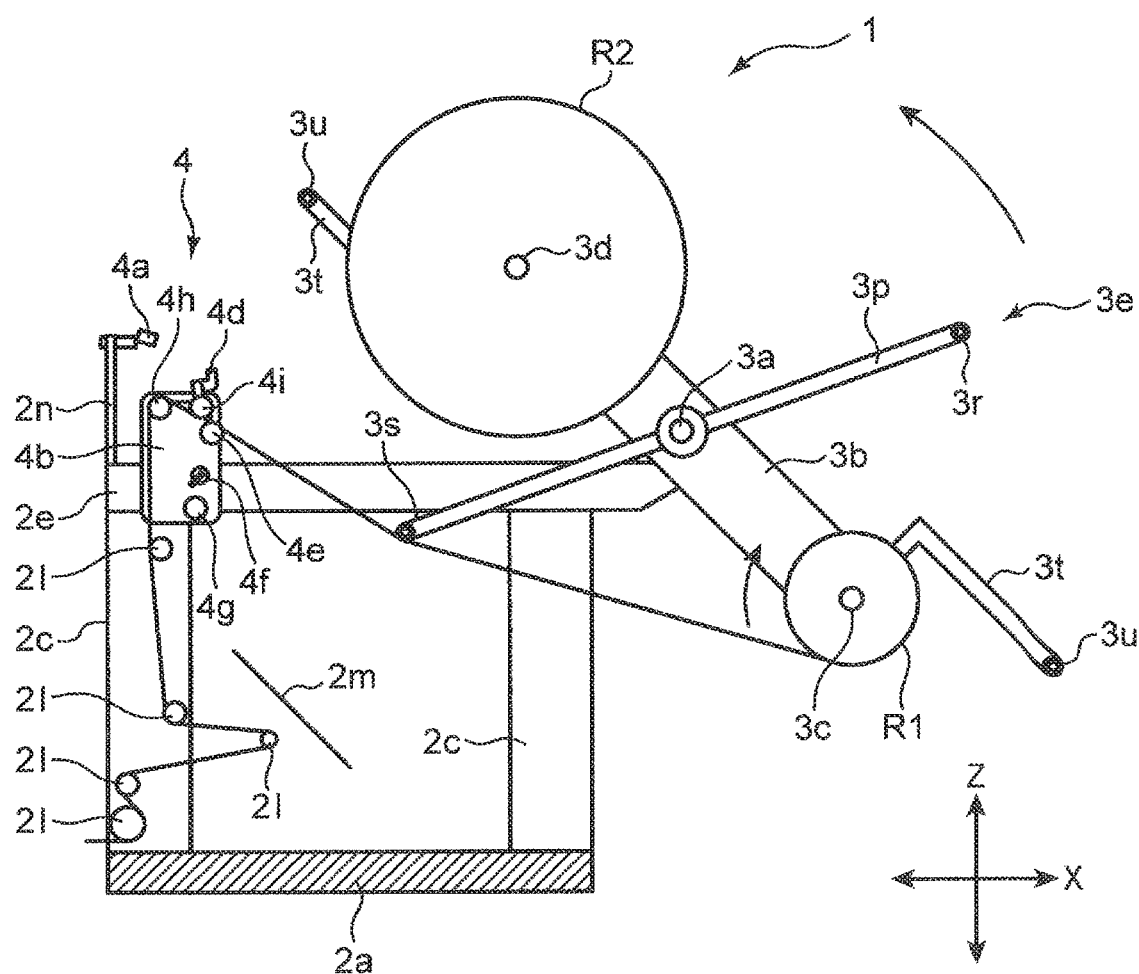
FIG. 10 is a front view showing a process in which the support shaft supporting the standby side roll in FIG. 1 is rotated toward a splice position.
Figure 11:
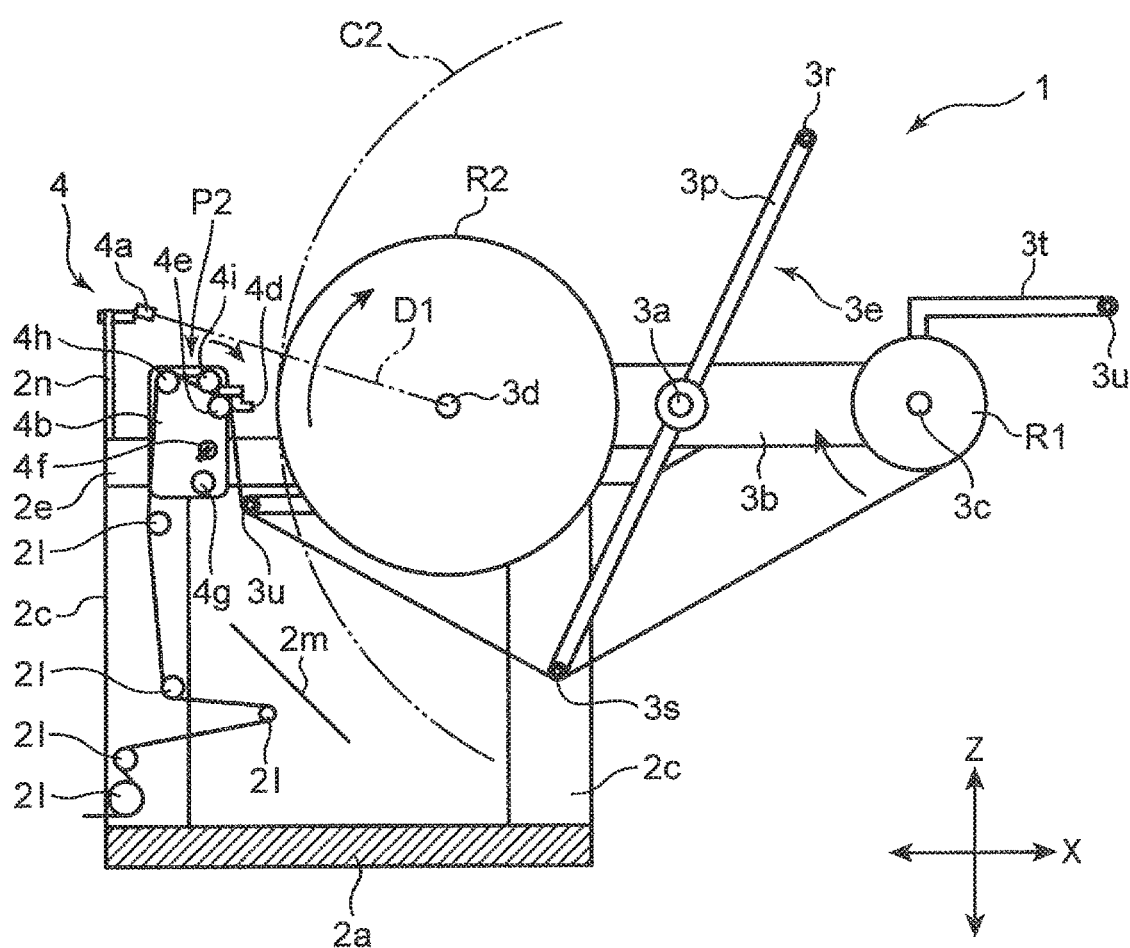
FIG. 11 is a front view showing a state in which the support shaft supporting the standby side roll shown in FIG. 1 is disposed at the splice position.

The rotation member 3b is rotated counterclockwise in FIG. 1 from the mounting position, and the rotation member 3b is rotated until the support shaft 3d is disposed at the splice position shown in FIG. 11 via the position shown in FIG. 10. In this state, a center of the rotation shaft 3a and a center of the support shaft 3d disposed at the splice position are disposed in parallel on the same horizontal plane. FIG. 2 is a plan view of the sheet supply device 1 in a state in which the support shaft 3d is disposed at the splice position.

Figure 17:
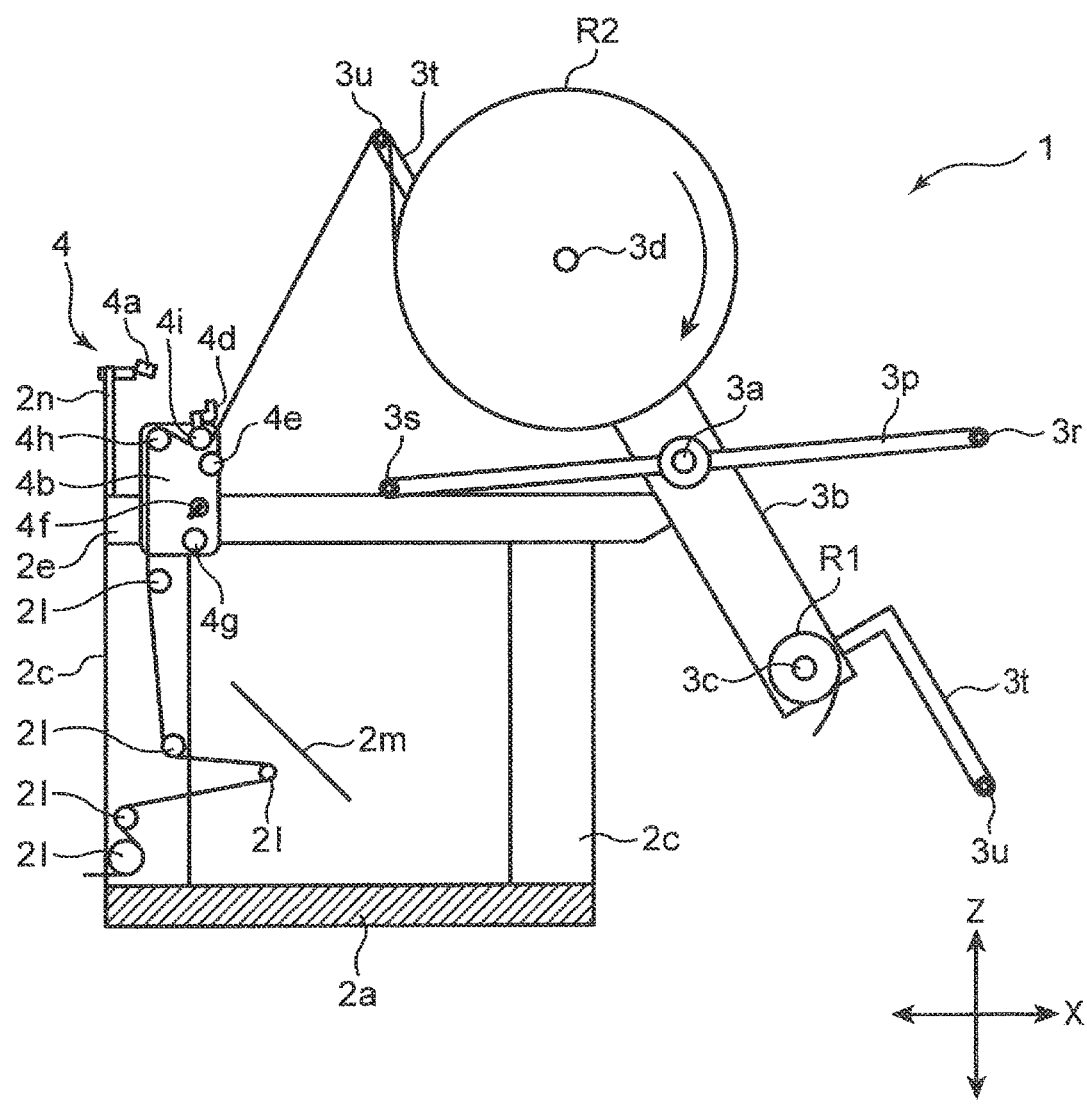
FIG. 17 is a front view showing a state in which a support shaft different from the support shaft shown in FIG. 1 is disposed at a mounting position.

At the splice position, when the sheet of the roll R1 is joined to the sheet of the roll R2 by the joining mechanism 4 described later, the supply of the sheet from the roll R2 is started, and the rotation member 3b is rotated clockwise from this state. As a result, as shown in FIG. 17, the support shaft 3c that supports the roll R1 is disposed at the above-described mounting position. As described above, the rotation member 3b is rotated forward and backward such that each of the support shafts 3c and 3d repeatedly moves from the mounting position to the splice position, and as a result, the sheets are sequentially supplied from the rolls R1 and R2 supported by the support shafts 3c and 3d.

Figure 5:
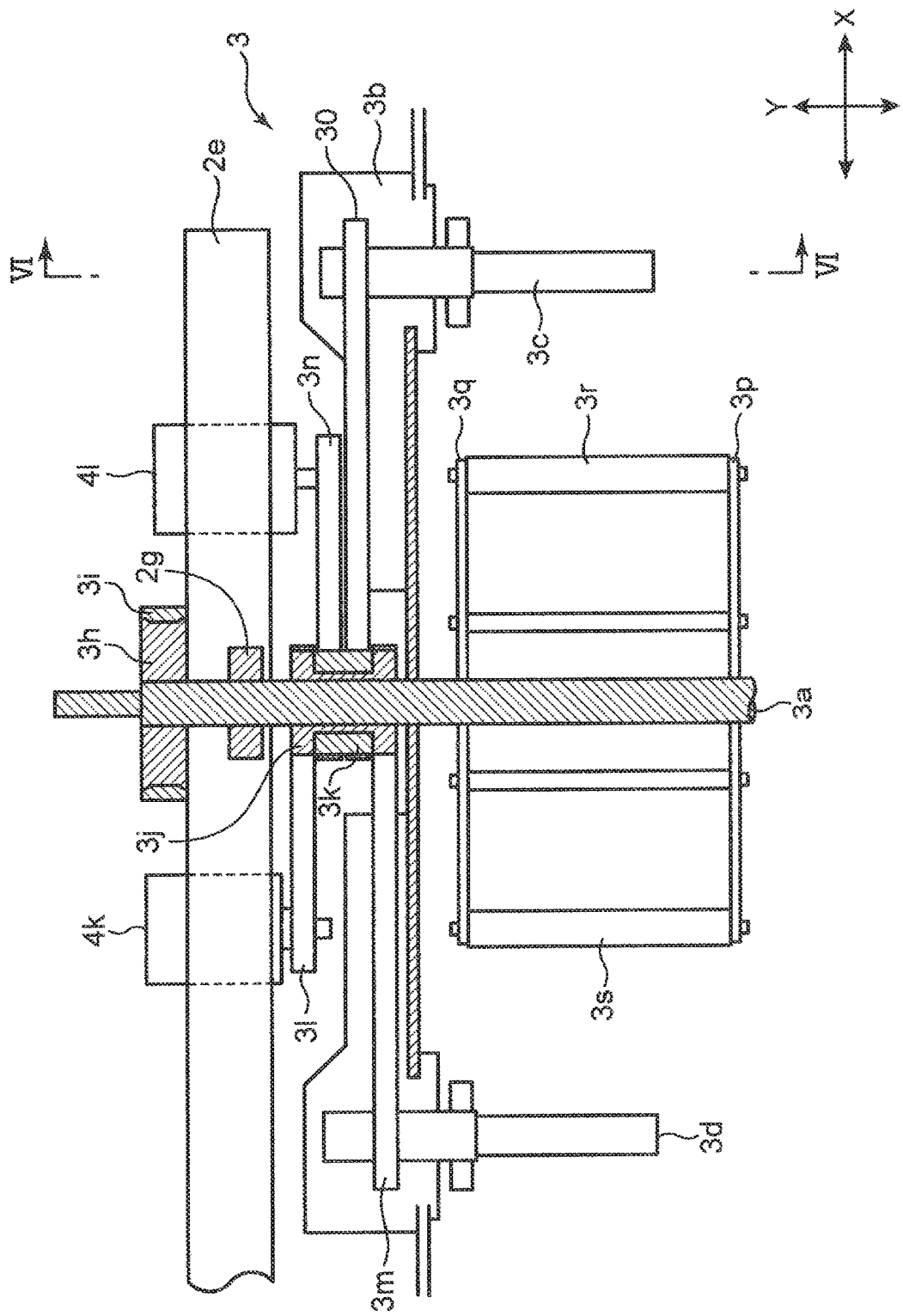
FIG. 5 is a plan cross-sectional view of a support mechanism in a state in which a support shaft supporting a standby side roll is disposed at a splice position.

Further, the support mechanism 3 includes a member drive mechanism that rotatably drives the rotation member 3b as described above, and a shaft drive mechanism that rotatably drives the support shafts 3c and 3d. Hereinafter, the member drive mechanism and the shaft drive mechanism will be described with reference to FIGS. 4 and 5. FIG. 5 is a plan cross-sectional view of the support mechanism 3 in a state in which the support shaft 3d is disposed at the splice position.

Specifically, the rotation drive mechanism includes a pulley 3h fixed to the rotation shaft 3a, and an endless belt 3i hung on the pulley 3h. The endless belt 3i is hung on a pulley fixed to a rotation shaft of a rotation member drive source (motor) 2j fixed to the column 2c of the base 2. When the rotation shaft of the rotation member drive source 2j is rotated, power of the rotation member drive source 2j is transmitted to the rotation shaft 3a via the endless belt 3i, and the rotation shaft 3a is rotated.

The shaft drive mechanism includes an inner pulley 3j that is attached to an outer side of the rotation shaft 3a in a state where the inner pulley 3j is rotatable about the rotation shaft 3a with respect to the rotation shaft 3a, an outer pulley 3k that is attached to an outer side of the pulley 3j in a state where the outer pulley 3k is rotatable about the rotation shaft 3a with respect to the pulley 3j, a first inner endless belt 3l and a second inner endless belt 3m that hang on the inner pulley 3j, and a first outer endless belt 3n and a second outer endless belt 3o that hang on the outer pulley 3k. The first inner endless belt 3l hangs on a pulley fixed to a rotation shaft of a shaft drive source (motor) 4k that is fixed to the beam 2e of the base 2, and the first outer endless belt 3n hangs on a pulley fixed to a rotation shaft of a shaft drive source (motor) 4l that is fixed to the beam 2e of the base 2. In addition, the second inner endless belt 3m hangs on a pulley fixed to the support shaft 3d, and the second outer endless belt 3o hangs on a pulley fixed to the support shaft 3c. When the rotation shafts of the shaft drive sources 4k and 4l rotate, power of the shaft drive sources 4k and 4l is transmitted to the support shafts 3c and 3d via the endless belts 3l to 3o, and the support shafts 3c and 3d rotate. In addition, since the inner pulley 3j and the outer pulley 3k are attached to the rotation shaft 3a in a state where the inner pulley 3j and the outer pulley 3k are rotatable with respect to the rotation shaft 3a, thereby the power of the shaft drive sources 4k and 4l can be transmitted to the support shafts 3c and 3d regardless of the rotating operation of the rotation shaft 3a.

Referring to FIGS. 1 to 3, the rotating guide member 3e and the adjacent guide members 3f and 3g each are for preventing a sheet of a roll (in FIG. 1, roll R1: hereinafter, the roll that is supplying the sheet is referred to as the supply side roll), which is supplying the sheet, of the rolls R1 and R2 from coming into contact with the other roll (in FIG. 1, roll R2: hereinafter, the roll other than the supply side roll are referred to as the standby side roll) when the support shafts 3c and 3d are rotated from the mounting position (see FIG. 1) to the splice position (see FIG. 11).

Specifically, the rotating guide member 3e includes a pair of holding plates 3p and 3q that are fixed to the rotation shaft 3a while extending in a direction intersecting the rotation member 3b and guide rollers 3r and 3s that are attached to both end portions of the holding plates 3p and 3q in the longitudinal direction. The holding plates 3p and 3q are fixed to the rotation shaft 3a in a state where the holding plates 3p and 3q are away from each other in the Y direction (see FIG. 2) so as to be disposed on both sides of the sheets on the rolls R1 and R2 in the Y direction. The guide rollers 3r and 3s are attached to the holding plates 3p and 3q in a state where the guide rollers 3r and 3s are rotatable about an axis along the Y direction between the holding plates 3p and 3q.

In addition, each of the adjacent guide members 3f and 3g includes a holding member 3t that extends from the rotation member 3b and a guide roller 3u that is attached to a tip of the holding member 3t. The holding member 3t is provided on one side (beam 2e side) of the rolls R1 and R2 in the Y direction. In addition, the holding member 3t has a base end portion that extends from the rotation member 3b to one side in the rotation direction (counterclockwise direction) of the rotation member 3b, and a tip portion that extends outward in the radial direction of the rotation shaft 3a from the base end portion. The guide roller 3u extends from the tip portion of the holding member 3t to a position on the other side (beam 2d side) of the rolls R1 and R2 in the Y direction, and is attached to the holding member 3t in a state where the guide roller 3u is rotatable about an axis along the Y direction.

When the rotation member 3b is rotated and the sheets of the rolls R1 and R2 come into contact with outer surfaces of the guide rollers 3r, 3s, and 3u, the sheets are guided downstream with the rotation of the guide rollers 3r, 3s, and 3u.

Figure 6:
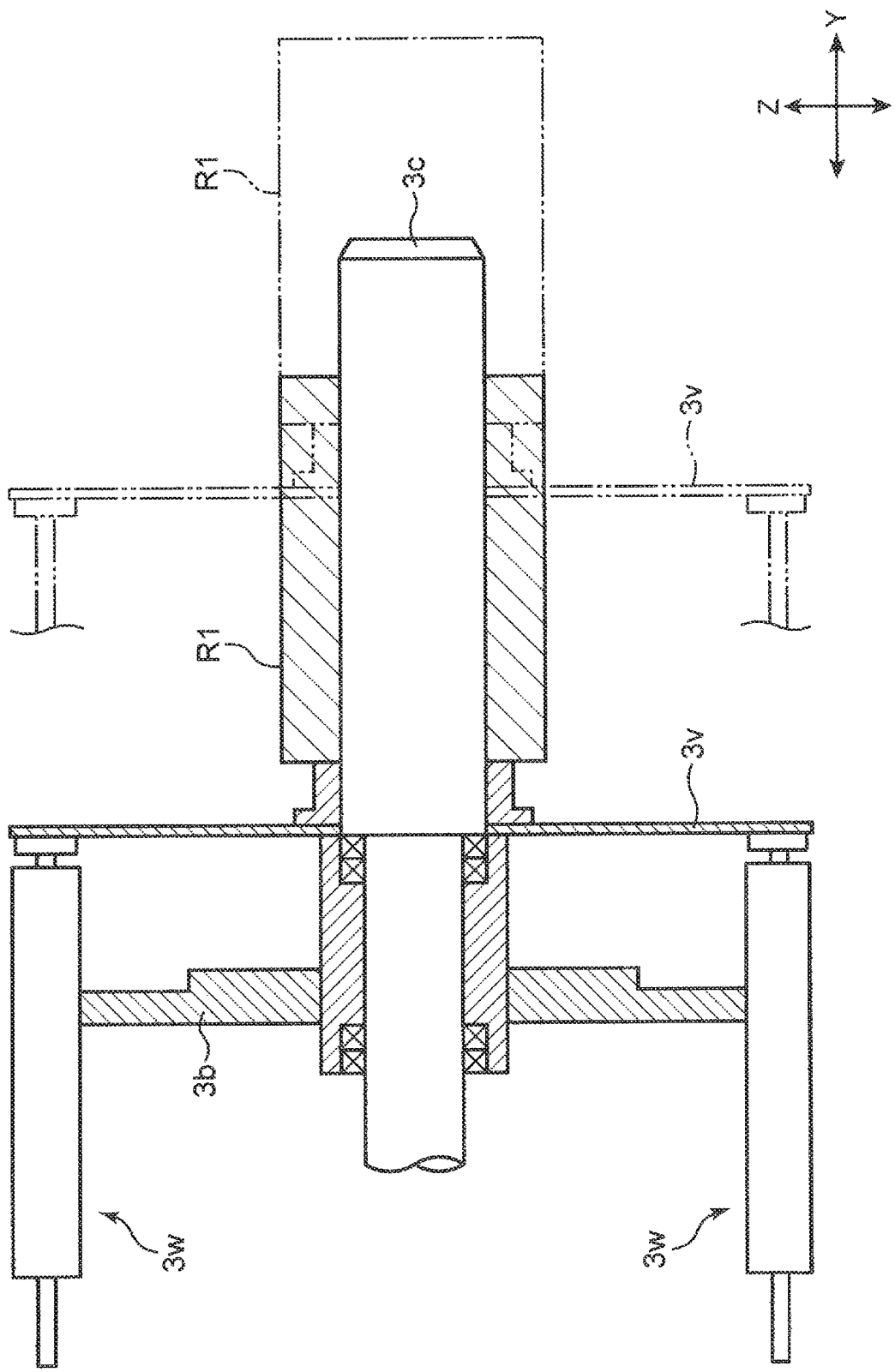
FIG. 6 is a cross-sectional view taken along line VI-VI in FIG. 5.

In addition, the support mechanism 3 includes a discharge mechanism that discharges the rolls R1, R2 mounted on the support shafts 3c, 3d from the support shafts 3c and 3d. FIG. 6 is a cross-sectional view taken along line VI-VI in FIG. 5. Although FIG. 6 shows the discharge mechanism provided on the support shaft 3c, a similar discharge mechanism is also provided on the support shaft 3d, and a description of this discharge mechanism will be omitted.

Referring to FIG. 6, the discharge mechanism includes a discharge member 3v that is attached to the support shaft 3c in a state in which the support shaft 3c penetrates, and a push-pull mechanism 3w (in the present embodiment, the number of push-pull mechanisms 3w is two, but the number of push-pull mechanisms 3w may be one) that pushes and pulls the discharge member 3v against the rotation member 3b. The push-pull mechanism 3w has a main body that is fixed to the rotation member 3b, and a displacement member that can be displaced in the Y direction with respect to the main body, and is constituted by, for example, an air cylinder or a motor having a ball screw mechanism. The push-pull mechanism 3w is configured to displace a non-discharge position where the displacement member is indicated by a solid line to a discharge position indicated by a two-dot chain line by receiving power or electric power from a discharge drive source (for example, an air supply source or a power supply: see FIG. 18) 2k provided on the base 2. The discharge member 3v moves in the Y direction as indicated by the two-dot chain line due to the displacement of the displacement member, and the roll R1 is pressed and discharged from the support shaft 3c.

Referring to FIGS. 1 and 2, the joining mechanism 4 includes an outer diameter detector 4a that is fixed to the base 2, a moving unit (a part of the pressing mechanism) 4b that is attached to the base 2 so as to be movable in the X direction with respect to the base 2, a unit drive mechanism 4c (see FIG. 4) that drives the moving unit 4b, an adhesion member detector 4d, a pressing roller (a part of the pressing mechanism) 4e, a cutter 4f, a first guide roller 4g (another guide roller), a second guide roller 4h (guide roller), a third guide roller 4i, and an urging mechanism (see FIG. 8) 4j that are attached to moving unit 4b, and the above-described shaft drive sources 4k and 4l (see FIG. 5).

The outer diameter detector 4a detects the outer diameter of the standby side roll (roll R2 in FIG. 11) disposed at the splice position, and is constituted by, for example, a laser sensor. The outer diameter detector 4a is fixed on the moving unit 4b by a bracket 2n that is provided at a position opposite to the support mechanism 3 with respect to the moving unit 4b in the two beams 2d and 2e so as to extend across the two beams 2d and 2e of the base 2. In addition, a detection axis D1 (see the two-dot chained line in FIG. 11: trajectory through which a center of a detection range passes from the outer diameter detector 4a to the roll: optical axis in the case of the laser sensor) of the outer diameter detector 4a attached to the bracket 2n is disposed at the same position in the Y direction as a central line of the standby side roll (roll R2 in the case of FIG. 11) in a width direction (Y direction), and is disposed perpendicularly to a central axis (central axis of the support shaft) of the standby side roll (see FIG. 11).

Figure 7:
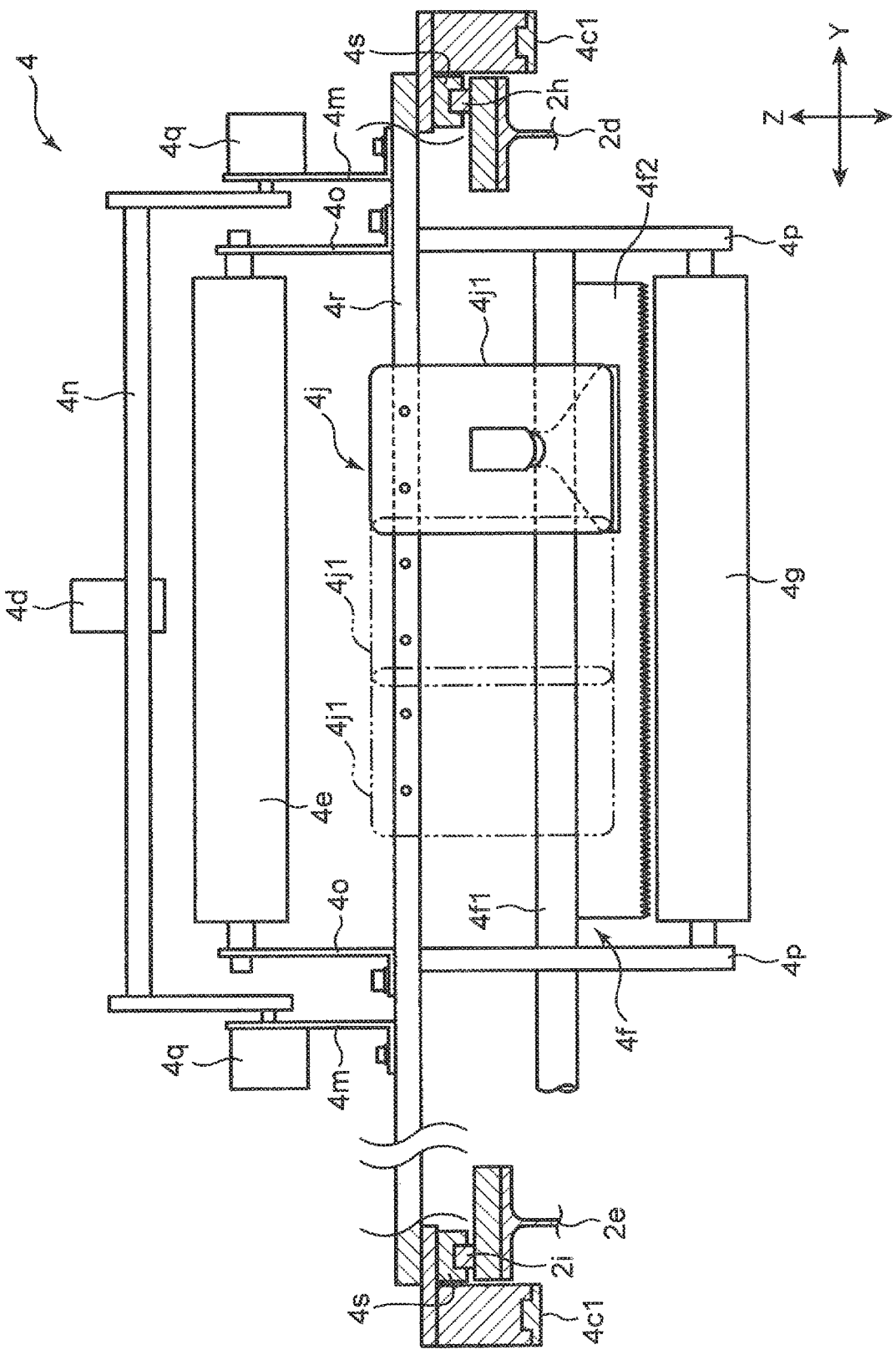
FIG. 7 is a partial side cross-sectional view showing a moving unit a part of which is omitted.

FIG. 7 is a partial side cross-sectional view showing the moving unit 4b a part of which is omitted. In FIG. 7, the second guide roller 4h and the third guide roller 4i are omitted.

The moving unit 4b includes a moving plate 4r that is provided on the two beams 2d and 2e of the base 2, a pair of sliders 4s that is fixed to both end portions of the moving plate 4r in the Y direction, a pair of detector brackets 4m that stands on the moving plate 4r so as to face each other in the Y direction, a revolution member 4n that is provided so as to extend across the two detector brackets 4m, a pair of roller support members 4o that stands on the moving plate 4r so as to face each other in the Y direction between the two detector brackets 4m, and a pair of brackets 4p that extends downward from a lower surface of the moving plate 4r so as to face each other in the Y direction.

The pair of sliders 4s is engaged with the rails 2h and 2i of the beams 2d and 2e, respectively. Thereby, the moving plate 4r, that is, the moving unit 4b can move in the X direction along the rails 2h and 2i with respect to the base 2. As shown in FIGS. 1 and 3, the portions (mounting plates 2a, columns 2b and 2c, beams 2d and 2e, rails 2h and 2i) that extend from the shaft support parts 2f and 2g to the moving unit 4b side in the base 2 correspond to a unit support part which has the moving unit 4b movably attached thereto and is mounted on a preset mounting surface. As shown in FIG. 1, the support shaft (support shaft 3d in FIG. 1) disposed at the mounting position is disposed in an area other than the area overlapping with the shaft support parts 2f and 2g and the unit support part in a side view viewed along the rotation shaft 3a.

Referring to FIGS. 4 and 7, the unit drive mechanism 4c that drives the moving plate 4r in the X direction are provided on each of the beam 2d and beam 2e of the base 2. Since these unit drive mechanisms 4c have the same configuration, only the unit drive mechanism 4c provided on the beam 2e will be described below. The unit drive mechanism 4c includes an endless belt 4c1 that is fixed to the moving plate 4r, a plurality of pulleys 4c2 that are provided on the beam 2e of the base 2 and has the endless belt 4c1 hanging thereon, and a unit drive source (servomotor, detector drive source, a part of the pressing member) 4c3 that is provided on the column 2c of the base 2. The unit drive source 4c3 has a rotation shaft (no reference numeral) on which the endless belt 4c1 hangs via the pulley. The plurality of pulleys 4c2 circularly hold the endless belt 4c1 such that a part of the endless belt 4c1 extends along the X direction, and the moving plate 4r is fixed to a part of the endless belt 4c1 extending in the X direction. When the unit drive source 4c3 is rotated in one direction, the power of the unit drive source 4c3 is transmitted via the endless belt 4c1, and the moving plate 4r advances toward the support mechanism 3, while when the unit drive source 4c3 is rotated in a reverse direction, the moving plate 4r retracts in a direction away from the support mechanism 3. As described above, the moving plate 4r advances and retracts in the X direction by the unit drive mechanism 4c.

The pair of roller support members 4o provided on the moving plate 4r are attached with the pressing roller 4e that presses the sheet of the supply side roll (roll R1 in FIG. 11) against the outer peripheral surface of the standby side roll (roll R2 in FIG. 11) in response to the driving of the unit drive mechanism 4c. The pressing roller 4e is disposed between the two roller support members 4o, and is rotatably attached to the two roller support members 4o about the axis along the Y direction.

In addition, in a state in which one (roll R2 in FIG. 14) of the rolls R1 and R2 is disposed at the splice position, the rotation shaft 3a, the support shaft 3d, and the pressing roller 4e are attached to the base such that the center of the rotation shaft 3a, the center of the support shaft 3d, and the center of the pressing roller 4e are disposed in parallel with each other on the same horizontal plane. In this state, the unit drive mechanism 4c moves (advances) the moving unit 4b in the horizontal direction, and as a result, the pressing roller 4e moves in the radial direction of the roll R2 such that the center of the pressing roller 4e moves on a straight line passing through the center of the rotation shaft 3a and the center of the support shaft (support shaft 3d in FIG. 11) disposed at the splice position, and the pressing roller 4e is pressed against the roll R2. As described above, the pressing roller 4e is pressed against a position (hereinafter, referred to as a pressing position P1) intersecting a straight line connecting between the center of the rotation shaft 3a, the center of the support shaft 3d, and the center of the pressing roller 4e on the outer peripheral surface of the roll (roll R2 in FIG. 14) that is disposed at the splice position by the unit drive mechanism 4c.

The moving unit 4b supports the pressing roller 4e (is attached to the base 2) such that the pressing roller 4e can be approached to and detached from the outer peripheral surface of the roll between an advance position (an example of a proximity position: see FIG. 14) where the pressing roller 4e is pressed against the pressing position P1 and a retracted position (see FIGS. 1 and 10) where the pressing roller 4e is away from the pressing position P1. When the support shaft is disposed at the splice position (see FIG. 11) in the state in which the assumed roll having the largest outer diameter is supported by the support shaft, the retracted position is a preset position as a position where the moving unit 4b and parts provided on the moving unit 4b can avoid the contact with the roll.

Referring to FIGS. 4 and 7, the revolution member 4n provided on the moving unit 4b is attached to the pair of detector brackets 4m in the state where the revolution member 4n is rotatable about the rotation shaft extending in the Y direction with respect to the pair of detector brackets 4m. In addition, the moving unit 4b is provided on the pair of detector brackets 4m, and includes a revolution drive source (for example, a motor) 4q that applies power for rotating the revolution member 4n to the revolution member 4n.

The revolution member 4n is attached with the adhesion member detector 4d that is constituted by, for example, a color sensor (for example, a line sensor or an area sensor) that can detect the position of an adhesion member H (see FIG. 12) in a rotation direction of a standby side roll, the adhesion member H being provided on the outer peripheral surface of the standby side roll. Here, the adhesion member H is a member (for example, double-sided tape) that is provided on the outer peripheral surface of the standby side roll, fastens an end of the sheet on the outer peripheral surface of the standby side roll, and permits adhesion from the outer side of the sheet of the supply side roll.

The adhesion member detector 4d is attached to the revolution member 4n such that a detection axis of the adhesion member detector 4d is disposed at the same position in the Y direction as the central line of the sheet of the standby side roll (R2 in FIG. 11) at the splice position (see FIG. 11) in the width direction (Y direction). The detection axis is a trajectory through which a midpoint of a detection line from the line sensor to an object to be detected passes, in the case of the line sensor, and a trajectory through which a center of an imaging range from the area sensor to the object to be detected passes, in the case of the area sensor.

Figure 12:
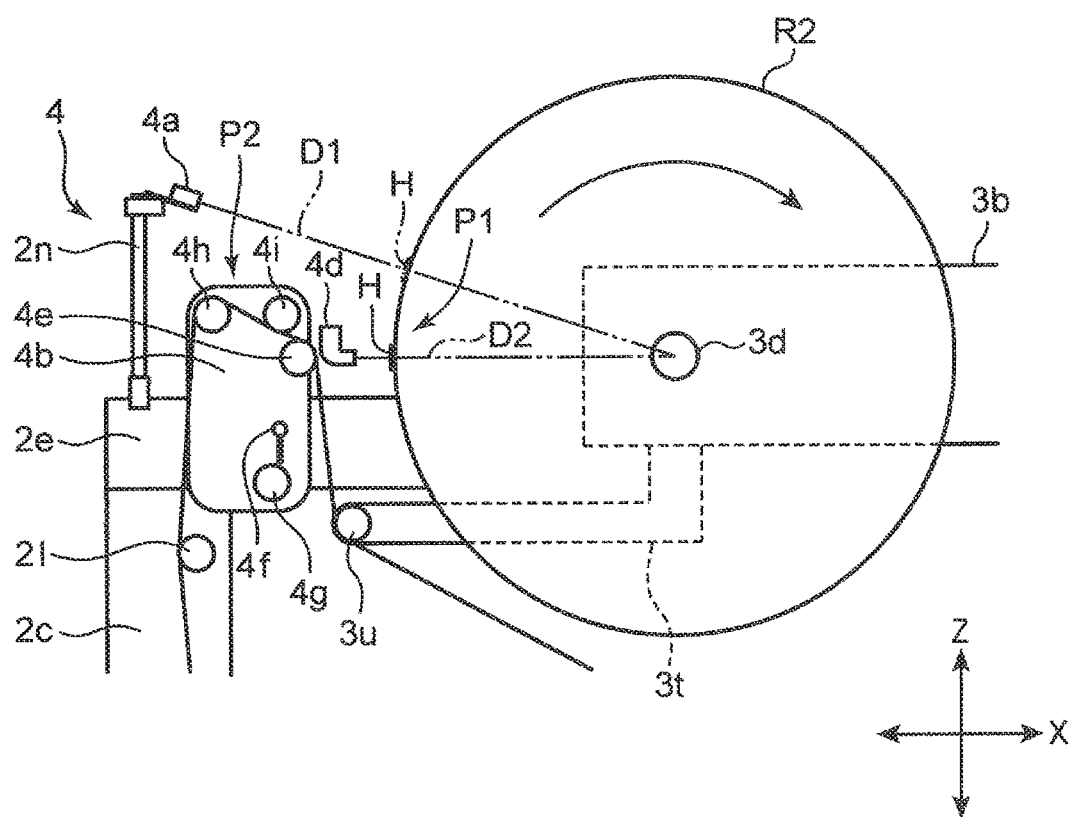
FIG. 12 is a partially enlarged front view showing a state in which the moving unit is disposed at a position corresponding to a detectable position.
Figure 13:
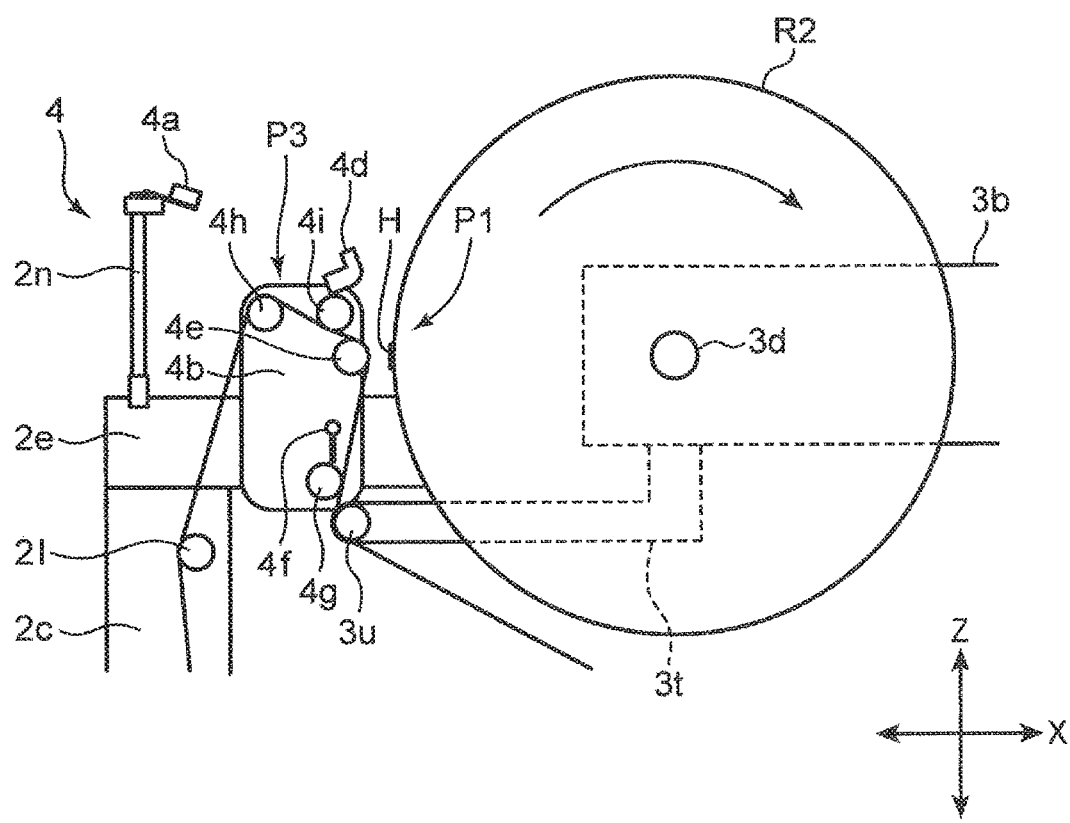
FIG. 13 is a partially enlarged front view showing a state in which the moving unit is disposed at a control switching position.

Further, the revolution member 4n can revolve with respect to a roller support member 4o between a detected position where the adhesion member detector 4d is disposed between the pressing roller 4e and the support shaft 3d such that a detection axis D2 of the adhesion member detector 4d is disposed perpendicularly with respect to the center of the support shaft 3d, as shown in FIG. 12, and a retracted position where the adhesion member detector 4d retracts from a position between the pressing roller 4e and the support shaft 3d, as shown in FIG. 13. The retracted position is the position of the adhesion member detector 4d set such that the distance from the adhesion member detector 4d to the center of the support shaft 3d is longer than the distance from the pressing roller 4e to the center of the support shaft 3d. The detection axis D2 of the adhesion member detector 4d disposed at the detected position is disposed at the same position as a straight line (see FIG. 14) connecting between the center of the rotation shaft 3a, the center of the support shaft 3d, and the center of the pressing roller 4e in a front view.

Figure 8:
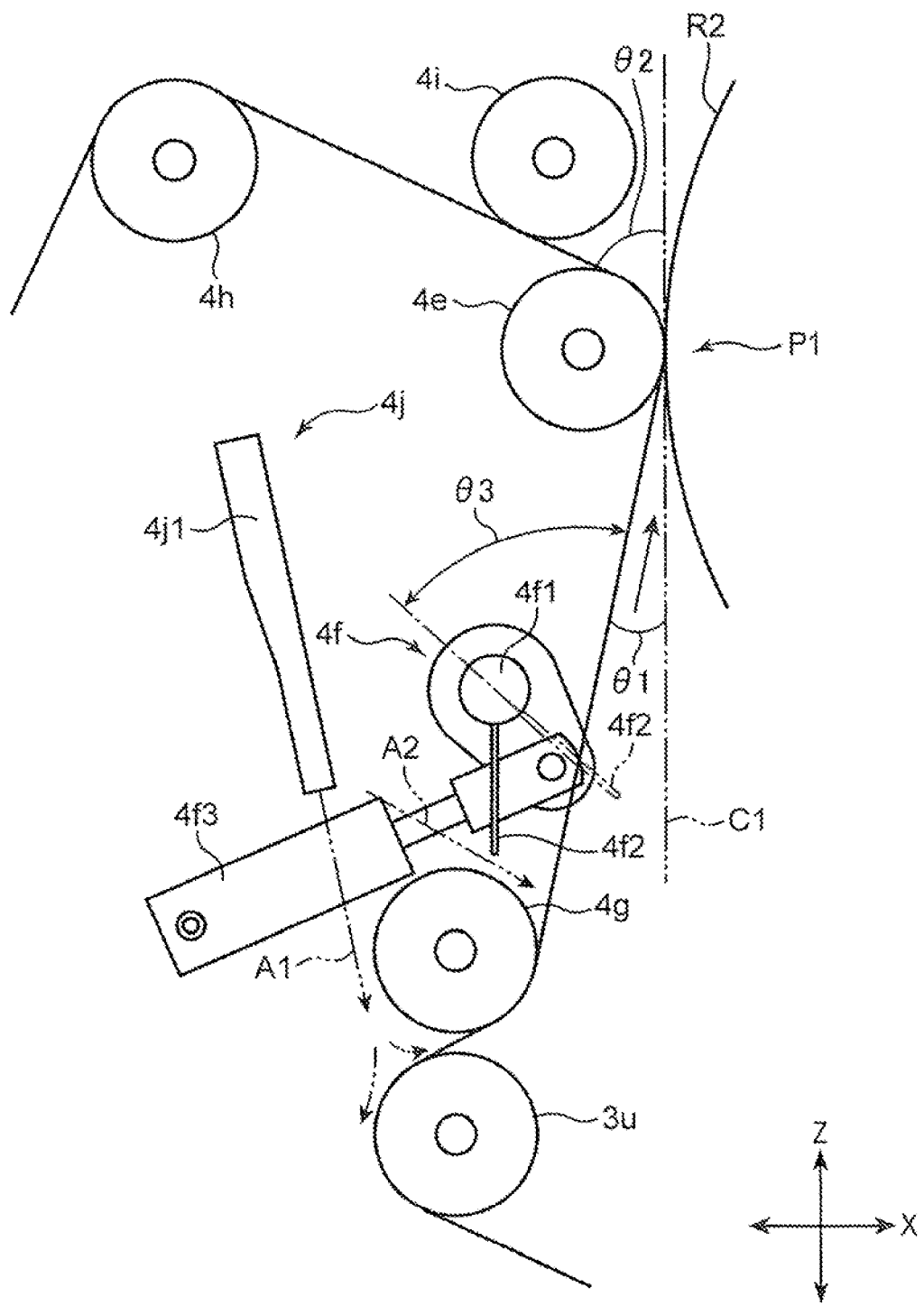
FIG. 8 is a schematic front view of a joining mechanism showing a positional relationship among a pressing roller, a cutter, a first guide roller, a second guide roller, a third guide roller, and an urging mechanism.

FIG. 8 is a schematic front view of the joining mechanism 4 showing the positional relationship among the pressing roller 4e, the cutter 4f, the first guide roller 4g, the second guide roller 4h, the third guide roller 4i, and the urging mechanism 4j. FIG. 8 shows a state in which the moving unit 4b moves to the advance position and the pressing roller 4e is pressed against the roll R2.

Referring to FIGS. 7 and 8, the pair of brackets 4p is attached with the first guide roller 4g that guides the sheet drawn from the supply side roll toward the pressing position P1 of the standby side roll (roll R2 in FIG. 8) disposed at the splice position. The first guide roller 4g is disposed between the two brackets 4p, and is rotatably supported by the two brackets 4p about an axis along the Y direction. Further, the first guide roller 4g is disposed at a position farther in the X direction from the roll (roll R2 in FIG. 8) disposed at the splice position than the pressing roller 4e, and is disposed below the pressing roller 4e. Thereby, as shown in FIG. 8, when the pressing roller 4e is pressed against the roll, the first guide roller 4g presses a middle part of a sheet guided from the guide roller 3u of the support mechanism 3 to the pressing position against the roll R2 side (support mechanism 3 side). As a result, the sheet is guided from the first guide roller 4g to the pressing position P1 at an angle θ1 with respect to a tangential line C1 to the outer peripheral surface of the roll at the pressing position P1.

In addition, the second guide roller 4h and the third guide roller 4i are attached to the roller support member 4o shown in FIG. 7. The two guide rollers 4h and 4i are each disposed between the two roller support members 4o, and are rotatably supported to the two roller support members 4o about the axis along the Y direction.

The second guide roller 4h is disposed at a position farther in the X direction from the roll (roll R2 in FIG. 8) disposed at the splice position than the pressing roller 4e, and is disposed above the pressing roller 4e. Thereby, as shown in FIG. 8, the second guide roller 4h changes a direction of a sheet downward at the second guide roller 4h to guide the sheet downward, the sheet being guided obliquely upward from the pressing position P1 to the second guide roller 4h in the state in which the pressing roller 4e is pressed against the roll. Here, the sheet is guided from the pressing position P1 to the second guide roller 4h at an angle θ2 with respect to the tangential line C1 to the outer peripheral surface of the roll at the pressing position P1.

Hereinafter, the disposition and functions of the first guide roller 4g and the second guide roller 4h will be described.

The second guide roller 4h is disposed on an opposite side to the roll (roll R2 in FIG. 8) at the splice position based on the tangential line C1 in the state where the pressing roller 4e is pressed against the pressing position P1. In addition, the second guide roller 4h guides the sheet such that the sheet is guided from the pressing roller 4e in a direction away from the roll R2.

The first guide roller 4g is disposed on the opposite side to the roll (roll R2 in FIG. 8) at the splice position based on the tangential line C1, and on the opposite side to the second guide roller 4h based on a plane including the pressing position P1 and the center of the pressing roller 4e in the state in which the pressing roller 4e is pressed against the pressing position P1. In addition, the first guide roller 4g guides the sheet such that the sheet is guided from the first guide roller 4g to the pressing position P1 in a direction approaching the roll R2.

The angle θ2 between the sheet guided from the pressing position P1 to the second guide roller 4h and the tangential line C1 is greater than the angle θ1 between the sheet guided from the first guide roller 4g to the pressing position P1 and the tangential line. As described above, since the angle θ1 is set to be smaller than the angle θ2, a space for the cutter 4f can be secured on an opposite side of the standby side roll R2 with respect to the sheet. In addition, since the angle θ1 is set to be smaller than the angle θ2, the guide roller 3u that guides the sheet to the pressing position P1 can be disposed close to the tangential line C1, and the sheet supply device 1 can be configured compactly.

The third guide roller 4i is disposed at a position closer to the tangential line C1 than the second guide roller 4h is, on an opposite side (upper side) of the first guide roller 4g with respect to the pressing roller 4e. As shown in FIG. 1, when one support shaft (support shaft 3d in FIG. 1) is disposed at the mounting position, the third guide roller 4i is provided to apply tension to the sheet between the support shaft and one guide roller 3u.

In addition, the cutter 4f configured to be capable of cutting a sheet between the first guide roller 4g and the pressing roller 4e is attached to the pair of brackets 4p. The cutter 4f includes a shaft 4f1 that is rotatably attached to both brackets 4p about a shaft extending in the Y direction, a rotary blade 4f2 that extends in the Y direction along the shaft 4f1 and is fixed to the shaft 4f1, cutter driving means 4f3 that rotatably drives the rotary blade 4f2 about the rotation shaft 4f1, and a cutter drive source 4f4 (see FIG. 18) that supplies air to the cutter driving means 4f3. The cutter driving means 4f3 is constituted by an air cylinder that has a cylinder and a rod that can be extended and retracted with respect to the cylinder. In addition, the cutter drive source 4f4 is constituted by a compressor or the like that supplies compressed air to the cutter driving means 4f3. The cutter driving means 4f3 may be constituted by a motor having a ball screw mechanism. In this case, the cutter drive source 4f4 may be constituted by a power supply that supplies electric power to the motor.

The cutter 4f is provided at a position (position opposite to the roll based on the tangential line C1) away from the sheet in the X direction between the first guide roller 4g and the pressing roller 4e (that is, below the pressing roller 4e). The cutter 4f is attached to the moving unit 4b in a state where the cutter 4f is moveable (rotatable) between a non-cutting position (position indicated by a solid line in FIG. 8) away from the sheet and a cutting position (position indicated by a two-dot chain line in FIG. 8) for cutting the sheet. Specifically, the rotary blade 4f2 rotated to the non-cutting position is disposed at a position away from the sheet between the first guide roller 4g and the pressing roller 4e in the X direction, and a tip portion of the rotary blade 4f2 rotated to the cutting position is disposed so as to intersect the sheet between the first guide roller 4g and the pressing roller 4e. In addition, the rotary blade 4f2 rotated to the cutting position takes a posture inclined downward with respect to a direction orthogonal to the sheet between the first guide roller 4g and the pressing roller 4e. Specifically, in the present embodiment, when an angle θ3 between the rotary blade 4f2 and the sheet is about 38°, the tip portion of the rotary blade 4f2 comes into contact with the sheet, but when the rotary blade 4f2 is further rotated from the contact position toward the sheet by about 5° to about 15°, the sheet is easily cut. Specifically, when the angle θ3 rotates from the contact position by about 10°, the sheet is most easily cut. As described above, the cutter 4f cuts the sheet of the supply side roll R1 at a position below the center (the center of the support shaft 3d) of the standby side roll R2.

Figure 9:
FIG. 9 is a schematic view showing a blade edge shape of a rotary blade.

FIG. 9 is a schematic view showing the blade edge shape of the rotary blade 4f2. As shown in FIG. 9, the rotary blade 4f2 has a plurality of V-shaped blades arranged in the Y direction, and these blades pierce the sheet to cut the sheet.

Figure 18:
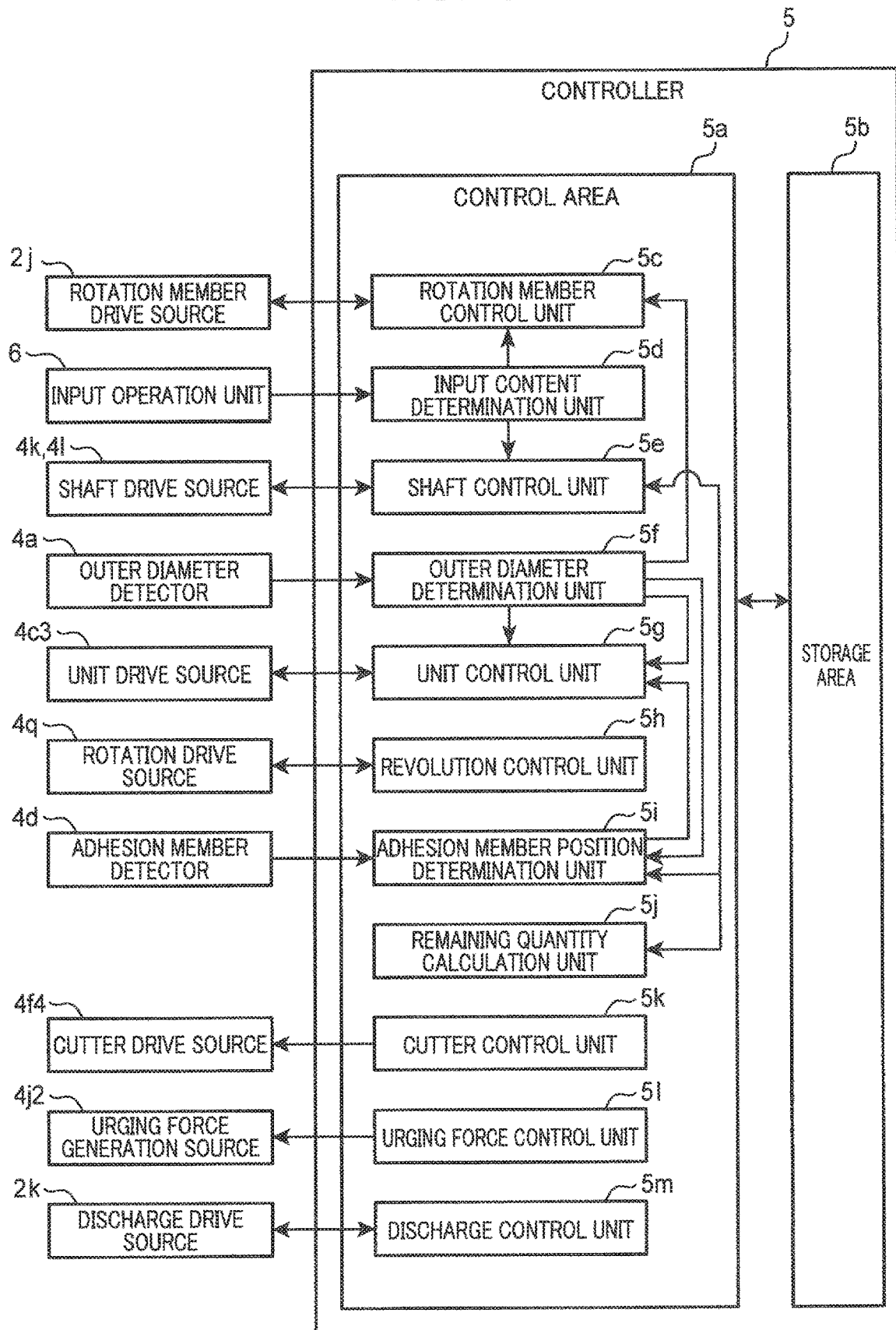
FIG. 18 is a block diagram showing an electrical configuration of a controller.

Referring to FIGS. 7, 8, and 18, the urging mechanism 4j is configured to be switched between a supply state in which a force in a direction away from the pressing position P1 is applied to a portion (hereinafter, referred to as a remaining portion) on an upstream side of the sheet in the conveyance direction from the cutting position by the cutter in the sheet of the roll (for example, roll R2 in FIG. 8) disposed at the splice position and a stop state in which the application of the force stops.

Specifically, the urging mechanism 4*j* includes an air nozzle 4*j*1 and an urging force generation source 4*j*2 (see FIG. 18) that supplies compressed air to the air nozzle 4*j*1.

The air nozzle 4*j*1 has an outlet that blows out the compressed air supplied from the urging force generation source 4*j*2. The outlet of the air nozzle 4*j*1 is disposed downward toward the guide roller 3*u* of the support mechanism 3 so as to apply a force to the upstream side of the sheet in the conveyance direction based on the first guide roller 4*g* in the sheet in the state in which the pressing roller 4*e* is pressed against the roll. In addition, the air nozzle 4*j*1 is detachably attached to the moving plate 4*r* of the moving unit 4*b* by a bolt (not shown). Specifically, the air nozzle 4*j*1 is attached to the moving plate 4*r* in the state in which a center position of the outlet of the air nozzle 4*j*1 in the Y direction coincides with a center position of the roller disposed at the splice position in the width direction (Y direction). There are a plurality of types of rolls R1 and R2 having different width dimensions, and a plurality of screw holes (see FIG. 7: no reference numeral) are provided on the moving plate 4*r* such that the mounting position of the air nozzle 4*j*1 can be changed for each of the plurality of types of rolls R1 and R2. For example, the air nozzle 4*j*1 can be attached to the moving plate 4*r* at a position indicated by a solid line and two positions indicated by a two-dot chain line in FIG. 7.

The compressed air blowing out from the outlet of the air nozzle 4*j*1 attached in this way is blown to the guide roller 3*u* through a position opposite to the cutter 4*f* of the first guide roller 4*g* as indicated by an arrow A1 in FIG. 8. As a result, a flow of air passing through the side of the guide roller 3*u* and a flow of air passing between the guide roller 3*u* and the first guide roller 4*g* are formed, and a force in a direction (downward in the present embodiment) away from the pressing position P1 is applied to the remaining portion of the sheet by these flows of air. In addition, the distance from the portion of the sheet where the force is applied from the air nozzle 4*j* 1 to the first guide roller 4*g* is smaller than the distance from the first guide roller 4*g* to the cutting position by the cutter 4*f*.

Here, the first guide roller 4*g* is disposed below the pressing roller 4*e* such that the downstream portion of the first guide roller 4*g* is bent upward with respect to the upstream portion of the first guide roller 4*g* in the conveyance direction in a conveyance path of the sheet. In this state, since the urging mechanism 4*j* applies a downward force to the sheet, it can more reliably urge the remaining portion of the sheet in the direction away from the pressing position by utilizing the effect of gravity.

As indicated by an arrow A2 in FIG. 8, the outlet of the air nozzle 4*j* 1 can be disposed such that the compressed air blows downward to the downstream side of the sheet in the conveyance direction from the first guide roller 4*g* in the sheet, specifically, the portion between the first guide roller and the cutter 4*f*. Even in this case, the force in the direction away from the pressing position P1 is applied to the remaining portion of the sheet.

Hereinafter, the sheet supply operation by the sheet supply device 1 will be described. In the following description, it is assumed that the operation is started from the state in which the sheet of the roll R1 supported by the support shaft 3*c* is supplied.

As shown in FIG. 1, in the state in which the rotation member 3*b* is rotated such that the support shaft 3*d* is disposed at the mounting position, the sheet is conveyed from the roll R1 supported by the support shaft 3*c* in the direction away from the rotation shaft 3*a*. Specifically, the sheet of the roll R1 is guided upward toward the guide roller 3*u* adjacent to the support shaft 3*d*, the conveyance direction of the sheet is changed downward by the guide roller 3*u*, changed upward by the third guide roller 4*i* of the moving unit 4*b*, and furthermore changed downward by the second guide roller 4*h*. The sheet guided to the second guide roller 4*h* is conveyed to the downstream side via a plurality of rollers 2*l* provided below the moving unit 4*b* in the base 2. A roller 2*l* shown at the bottom of FIG. 1 in the plurality of rollers 2*l* is driven by a motor (not shown), and one disposed above the roller 2*l* is a tension control roller. That is, a tension control roller 2*l* is provided between the moving unit 4*b* and a driving roller 2*l*.

In addition, in the state shown in FIG. 1, the standby side roll (roll R2 in the figure) around which the sheet to be subsequently conveyed is wound is mounted on the support shaft 3*d* disposed at the mounting position.

After the standby side roll is mounted, a worker performs a predetermined operation, and as a result, the rotation member 3*b* is rotated counterclockwise, and the support shaft (support shaft 3*d* in the figure) supporting the standby side roll is disposed at the splice position shown in FIG. 11 via the posture shown in FIG. 10. In this state, the sheet of the supply side roll (roll R1 in the figure) is guided downward from the supply side roll by the guide roller 3*s* disposed below both support shafts 3*c* and 3*d*, the conveyance direction of the sheet is changed upward by the guide roller 3*s*, and the sheet of the supply side roll is guided to the guide roller 3*u* adjacent to the standby side roll. The conveyance direction of the sheet of the supply side roll is changed upward by the guide roller 3*u* and the sheet is guided to the moving unit 4*b*. In this way, the sheet of the supply side roll is guided to the moving unit by the guide rollers 3*s* and 3*u* in the state in which the standby side roll bypasses to the lower side.

Specifically, the guide roller 3*u* is fixed to the rotation member 3*b* such that the guide roller 3*u* is positioned below the pressing roller 4*e* on a side near the pressing roller 4*e* with the support shaft 3*d* disposed at the splice position, and on an outer side of a circular trajectory C2 (see FIG. 11) drawn by a portion positioned farthest from the rotation shaft 3*a* on the outer peripheral surface (outer peripheral surface of the standby side roll having the assumed maximum outer diameter) of the standby side roll according to the rotation of the rotation member 3*b*. Preferably, the guide roller 3*u* is fixed to the rotation member 3*b* such that the guide roller 3*u* is positioned on the opposite side to the standby side roll based on the tangential line c1 to the outer peripheral surface of the standby side roll at the pressing position P1. The conveying direction of the sheet supplied from the supply side roll is changed by the guide roller 3*u* at the outer side of the circular trajectory C2, preferably, on the opposite side to the standby side roll based on the tangential line c1, and the sheet is guided to a position between the pressing roller 4*e* and the standby side roll.

When the rotation member 3*b* is rotated from the above-described mounting position (FIG. 1) to the splice position (FIG. 11), the moving unit 4*b* is disposed at the retracted position shown in FIGS. 1 and 10 which is farthest away from the rotation shaft 3*a* in the X direction. Note that the retracted position of the moving unit 4*b* is set on the outer side of the above-described trajectory C2 (see FIG. 11). At this time, the support shaft (support shaft 3*d* in FIG. 1)

supporting the standby side roll stops, and the adhesion member detector 4d is disposed at the retracted position.

As shown in FIG. 11, since the second guide roller 4h is fixed to the moving unit 4b on the downstream side of the pressing roller 4e in the conveyance direction of the sheet, the sheet being conveyed comes into contact with the peripheral surface of the pressing roller 4e in the state in which the standby side roll is disposed at the splice position. As a result, the moving unit 4b is rotated by the sheet being conveyed in the state of being positioned at the detection standby position P2, and then is less likely to affect the tension and the like of the sheet being conveyed as compared to the case where the moving unit 4b comes into contact with the sheet during the joining operation.

In addition, when the standby side roll is disposed at the splice position, the outer diameter of the standby side roll is detected by the outer diameter detector 4a while the standby side roll is rotated. On the basis of the result of detection, the moving unit 4b moves from the retracted position to a detectable position (detection standby position) P2 where the adhesion member H of the standby side roll can be detected by the adhesion member detector 4d. The detectable position P2 is set on a straight line connecting between the center of the support shaft (support shaft 3d in FIG. 11) that supports the standby side roll and a rotation center of the pressing roller 4e. When the moving unit 4b moves to the detectable position P2, the adhesion member detector 4d is rotated from the retracted position to the detected position. The detectable position P2 can secure the preset accuracy as the accuracy of the detection of the adhesion member H by the adhesion member detector 4d, and is set such that the adhesion member detector 4d at the detected position is at the farthest position from the outer peripheral surface of the standby side roll. Specifically, in the state where the adhesion member detector 4d is disposed at the detectable position P2, the distance from the outer peripheral surface of the standby side roll to the tip portion of the adhesion member detector 4d at the detected position is, for example, 70 mm.

When the adhesion member detector 4d moves to the detectable position P2, as shown in FIG. 12, the position of the adhesion member H in the rotation direction of the standby side roll is detected by the adhesion member detector 4d while the standby side roll is rotated. On the basis of the result of detection, the standby side roll is rotated such that the adhesion member H is positioned within the detection range (within the range intersecting the detection axis D1) of the outer diameter detector 4a, and in this state, the outer diameter of the portion of the adhesion member H on the outer peripheral surface of the standby side roll is detected by the outer diameter detector 4a.

Next, as shown in FIG. 13, the adhesion member detector 4d moves to the retracted position, the support shaft (support shaft 3d in FIG. 12) supporting the standby side roll is rotated according to the sheet conveyance speed, and the moving unit 4b is started to move the standby side roll. As will be described in detail later, during the movement of the moving unit 4b, the position of the unit drive source 4c3 is controlled in a state in which the pressing roller 4e is positioned in an area farther away from the standby side roll than the control switching position P3 shown in FIG. 13. On the other hand, in the state where the pressing roller 4e is positioned in the area from the control switching position P3 to the outer peripheral surface of the standby side roll, the unit drive source 4c3 is torque-controlled. The control switching position P3 is set at a position farther away from the pressing position P1 than the position separated by a warped quantity of the standby side roll in the radial direction. Specifically, the control switching position P3 in the present embodiment is a position closer to the standby side roll than the detectable position P2, and is a position where the distance from the pressing roller 4e to the outer peripheral surface (adhesion member H) of the standby side roll is set to be 5 mm.

The state where the pressing roller 4e is positioned in an area farther away from the standby side roll than the control switching position P3 means the state in which the portion (tip portion) closest to the support shaft in an outer peripheral portion of the pressing roller 4e pressed against the standby side roll is positioned in the area farther away from the standby side roll than the control switching position P3. On the other hand, the state in which the pressing roller 4e is positioned in the area from the control switching position P3 to the outer peripheral surface of the standby side roll means the state in which the tip portion of the pressing roller 4e is positioned in the area from the control switching position P3 to the outer peripheral surface of the standby side roll.

Figure 19:
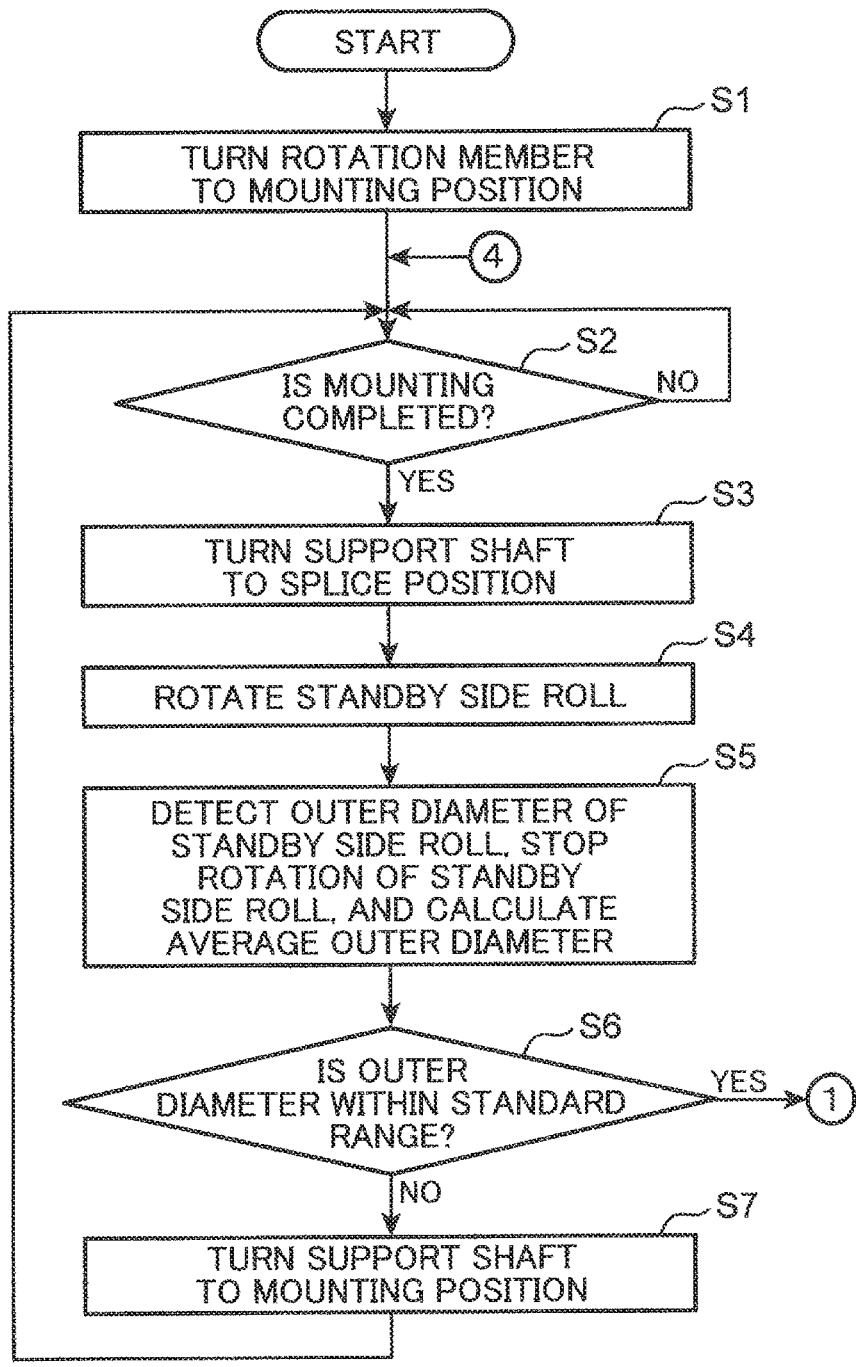
FIG. 19 is a flowchart showing a process executed by the controller of FIG. 18.
Figure 20:
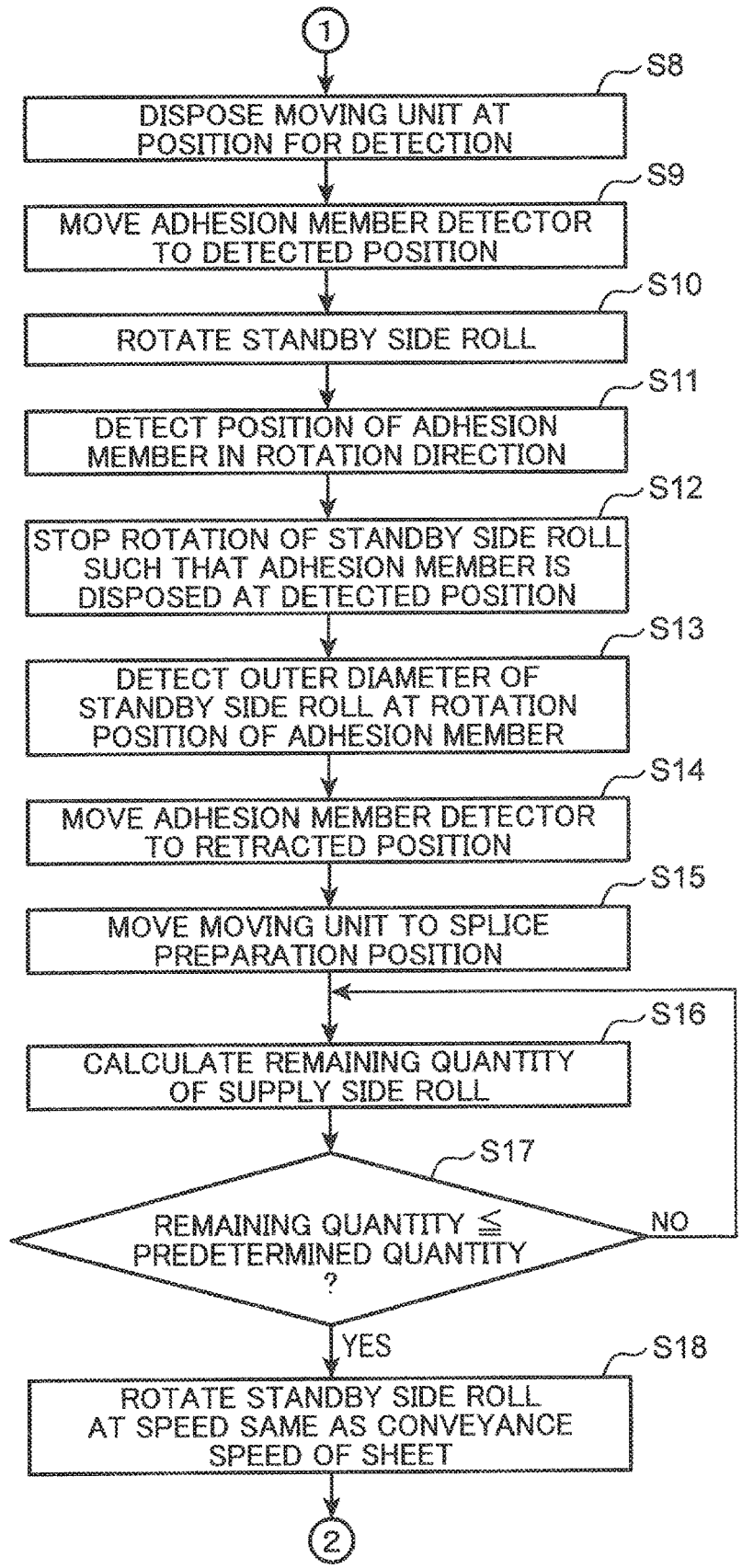
FIG. 20 is a flowchart showing the process executed by the controller in FIG. 18.

As shown in FIG. 19, during the execution period of the torque control with respect to the unit drive source 4c3, the pressing roller 4e is pressed to the pressing position P1 of the standby side roll via the sheet of the supply side roll. Thereby, the sheet of the standby side roll is joined to the sheet of the supply side roll via the adhesion member H.

In this state, the cutter 4f is rotated from the non-cutting position indicated by the solid line in FIG. 8 to the cutting position indicated by the two-dot chain line in FIG. 8. Thereby, the sheet of the supply side roll is cut, and the conveyance of the sheet of the standby side roll is started (the standby side roll becomes the supply side roll). When the sheet of the standby side roll is cut, the cutter 4f is rotated to the non-cutting position.

Figure 15:
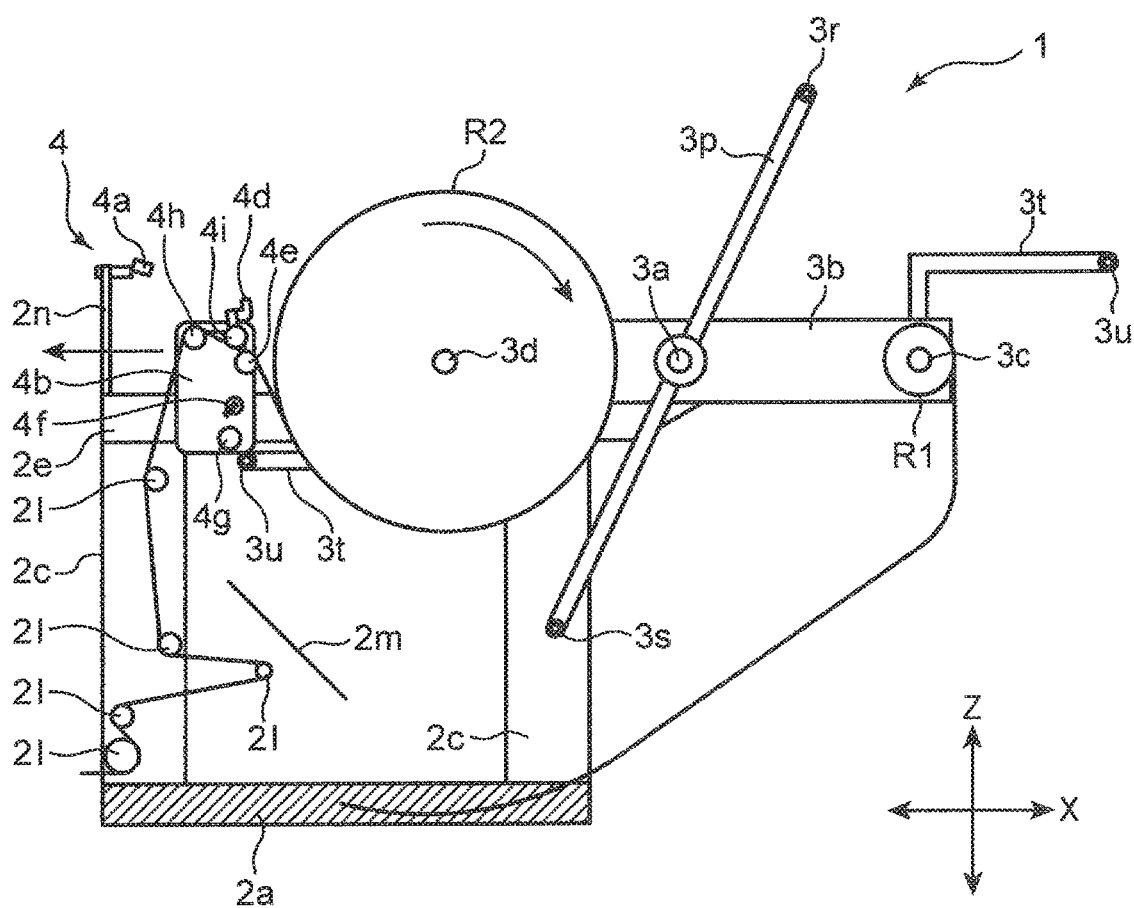
FIG. 15 is a front view showing a state after a sheet of a supply side roll is cut.

As shown in FIG. 15, when the sheet of the roll (the roll R1 in FIG. 15) which was the supply side roll is cut, the remaining portion of the sheet falls down from the moving unit 4b. Here, the base 2 is provided with a cover 2m that covers the roller 2l, which is positioned below the moving unit 4b, from above. The cover 2m can prevent the remaining portion of the sheet from being caught in the sheet conveyance path.

Figure 16:
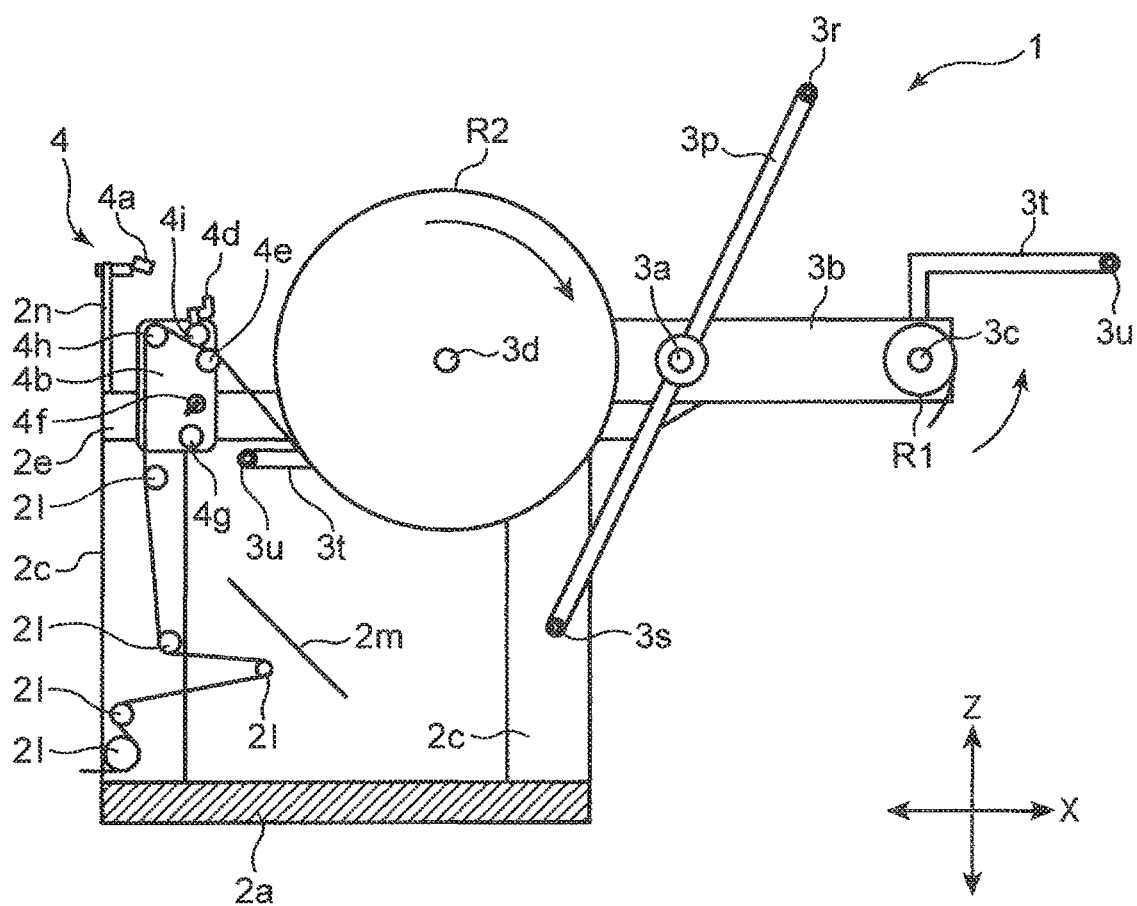
FIG. 16 is a front view showing a state in which the sheet is wound by the support shaft supporting the supply side roll.

As shown in FIG. 16, the remaining portion of the sheet is wound by the rotation of the support shaft (support shaft 3c in FIG. 16) supporting the roll that was the supply side roll.

As shown in FIG. 17, the rotation member 3b is rotated clockwise, and as a result, the support shaft (support shaft 3c) supporting the roll that was the supply roll is disposed at the mounting position. In this state, the discharge member 3v shown in FIG. 6 moves toward the tip side of the support shaft 3c, and as a result, the roll that was the supply side roll is discharged, and a new standby side roll is mounted on the support shaft 3c by a worker.

Hereinafter, the controller 5 for realizing the operation of the above-described sheet supply device will be described with reference to FIG. 18. FIG. 18 is a block diagram showing an electrical configuration of the controller 5.

The controller 5 controls the joining mechanism 4 such that the sheet of the supply side roll is joined to the sheet of the standby side roll when the remaining quantity of the sheet of the supply side roll is equal to or less than the preset remaining quantity in the state in which the sheet of the supply side roll is supplied.

The controller 5 is connected to the rotation member drive source 2j, an input operation unit 6, the shaft drive sources 4k and 4l, the outer diameter detector 4a, the unit drive source 4c3, the revolution drive source 4q, the adhesion member detector 4d, the cutter drive source 4f4, the urging force generation source 4j2, and the discharge drive source 2k. The input operation unit 6 is for inputting a set value and a command value for the sheet supply device 1.

Specifically, the controller 5 is constituted by a combination of a CPU, a RAM, a ROM, and the like, and includes a control area 5a that controls the operation of the sheet supply device 1 and a storage area 5b that is connected to the control area 5a and stores set items and the like.

The control area 5a causes information used in the control area 5a to store in the storage area 5b and executes control by the units 5c to 5m on the basis of the information stored in the storage area 5b. Specifically, the control area 5a includes a rotation member control unit 5c, an input content determination unit 5d, a shaft control unit 5e, an outer diameter determination unit 5f, a unit control unit (motor control unit) 5g, a revolution control unit 5h, an adhesion member position determination unit 5i, a remaining quantity calculation unit 5j, a cutter control unit 5k, an urging force control unit 5l, and a discharge control unit 5m.

The input content determination unit 5d determines the contents input by the input operation unit 6, and transfers a command related to the input to the rotation member control unit 5c, the shaft control unit 5e, and the storage area 5b. A worker inputs turn on/off of a power supply of the sheet supply device 1, an indication that the standby side roll has been mounted on the support shaft, a thickness of the sheet of the roll, and a diameter of the sheet of the roll (or the number of turns), and the like through the input operation unit 6.

The rotation member control unit 5c executes the rotation of the rotation member drive source 2j and stops the rotation, on the basis of the command from the input content determination unit 5d and the setting stored in the storage area 5b.

The shaft control unit 5e drives the shaft drive sources 4k and 4l and stops the driving, on the basis of the command from the input content determination unit 5d and the setting stored in the storage area 5b. In addition, the shaft control unit 5e has a sensor, and transfers information on the positions and rotation speeds of the support shafts 3c and 3d in the rotation direction obtained by the sensor to the adhesion member position determination unit 5i and the remaining quantity calculation unit 5j.

The adhesion member position determination unit 5i determines the position of the adhesion member H in the rotation direction of the standby side roll on the basis of the result of detection from the adhesion member detector 4d in the state in which the standby side roll is rotated by the shaft control unit 5e. Specifically, the position of the adhesion member H in the rotation direction of the standby side roll is determined on the basis of the result of detection from the adhesion member detector 4d and the shaft control unit 5e.

The outer diameter determination unit 5f determines the outer diameter of the standby side roll on the basis of the result of detection from the outer diameter detector 4a, and determines whether the determined outer diameter is within a preset standard range. In addition, the outer diameter determination unit 5f transfers information on the determined outer diameter of the standby side roll to the corresponding control unit (for example, the rotation member control unit 5c, the unit control unit 5g, and the adhesion member position determination unit 5i).

Here, the position of the adhesion member H in the rotation direction of the standby side roll detected by the adhesion member position determination unit 5i is transferred to the shaft control unit 5e. The shaft control unit 5e rotates the standby side roll on the basis of the position information from the adhesion member position determination unit 5i such that the adhesion member H is positioned within the detection range of the outer diameter detector 4a. In this state, the outer diameter determination unit 5f determines the outer diameter of the standby side roll in the portion where the adhesion member H is positioned, on the basis of the detection value of the outer diameter detector 4a.

The unit control unit 5g controls the unit drive source 4c3 on the basis of the outer diameter of the standby side roll determined by the outer diameter determination unit 5f such that the sheet of the supply side roll is pressed against the adhesion member H of the standby side roll. Specifically, the unit control unit 5g determines the detectable position P2 (see FIG. 11) of the adhesion member detector 4d where the adhesion member detector 4d can avoid contacting with the outer peripheral surface of the standby side roll and where the adhesion member detector 4d can detect the adhesion member H on the basis of the result of detection from the outer diameter detector 4a. Further, the unit control unit 5g controls the driving of the unit drive source 4c3 such that the adhesion member detector 4d moves to the detectable position when the detectable position P2 is closer to the support shaft disposed at the splice position than the retracted position (see FIG. 10).

Here, the outer diameter determination unit 5f determines the outer diameters of the standby side rolls at a plurality of locations in the rotation direction of the standby side roll on the basis of the result of detection from the outer diameter detector 4a in the state in which the standby side roll is rotated by the shaft drive sources 4k and 4l, and determines an average outer diameter of the standby side roll on the basis of these outer diameters. Then, the unit control unit 5g determines the detectable position on the basis of the average outer diameter.

Further, the unit control unit 5g controls the position of the unit drive source (servomotor) 4c3 in the state in which the pressing roller 4e is positioned in the area farther away from the standby side roll than the control switching position P3 (see FIG. 13) away from the outer peripheral surface of the standby side roll by a predetermined distance while the standby side roll is rotated by the shaft control unit 5e. On the other hand, the unit control unit 5g torque-controls the unit drive source 4c3 in the state in which the pressing roller 4e is positioned in the area from the control switching position P3 to the outer peripheral surface of the standby side roll, thereby pressing the pressing roller 4e against the outer peripheral surface of the standby side roll via the sheet of the supply side roll.

Here, the position control is control to move the pressing roller to a target position at a predetermined timing by performing feedback control using a deviation between the current position of the pressing roller determined using a sensor having a servomotor and a predetermined target position. In addition, the torque control is to control a current value supplied to the servomotor such that a torque of the servomotor determined by the current value supplied to the servomotor becomes a predetermined torque.

Further, the unit control unit 5g switches the control of the unit drive source 4c3 from the position control to the torque control while maintaining the driving of the unit drive source 4c3 when the pressing roller 4e approaches the standby side roll beyond the control switching position P3 from the area farther away from the standby side roll than the control switching position P3. Here, the control switching position P3 is set at a position (5 mm in the present embodiment) away from the standby side roll such that even if the outer peripheral surface of the standby side roll is warped, the pressing roller 4e does not come into contact with the warped outer peripheral surface of the standby side roll in the state in which the position of the pressing roller 4e is controlled.

Figure 14:
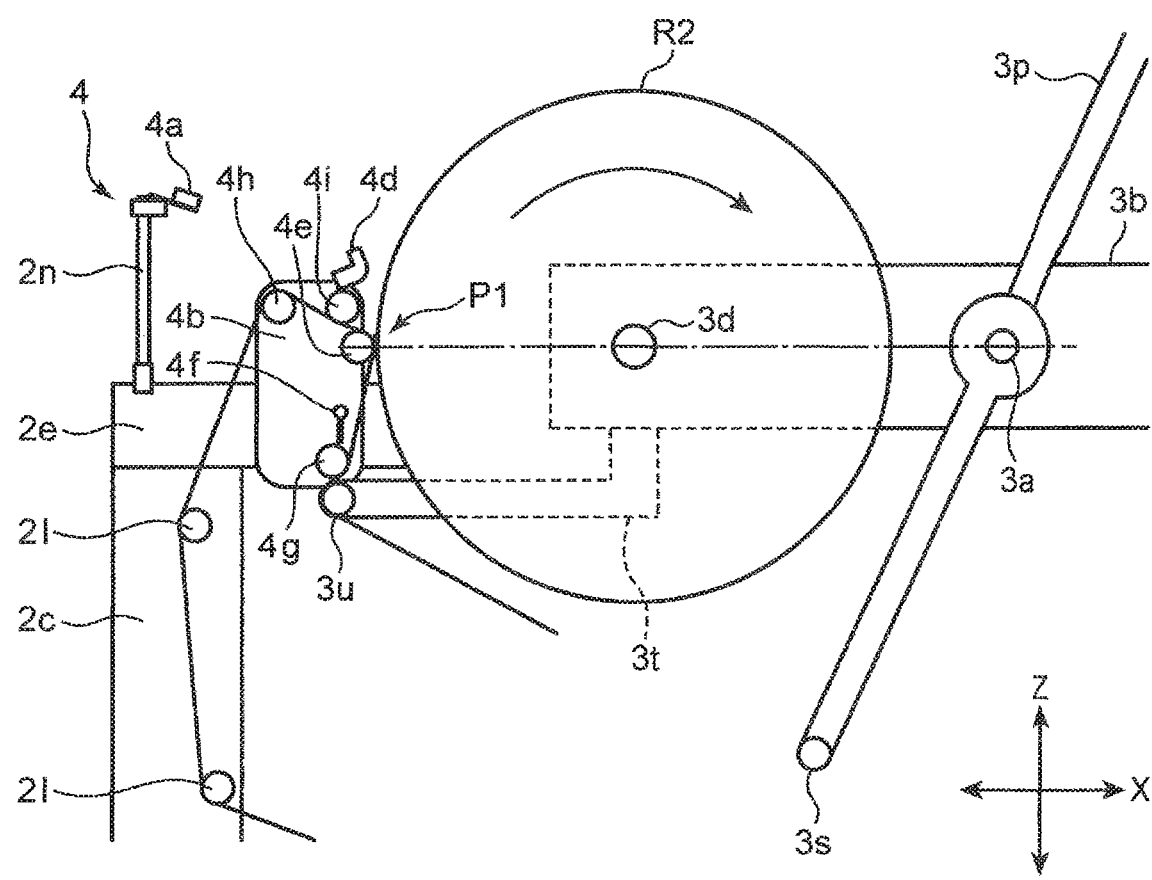
FIG. 14 is a partially enlarged front view showing a state in which the moving unit is disposed at an advance position.

Here, the adhesion member position determination unit 5i determines pressing timing when the adhesion member H arrives at the pressing position P1 of the standby side roll in the rotation direction of the standby side roll on the basis of the result of detection from the outer diameter detector 4a and the adhesion member detector 4d, and the rotation speed of the support shaft supporting the standby side roll obtained from the shaft control unit 5e. Here, the shaft control unit 5e controls the driving of the shaft drive sources 4k and 4l of the support shaft that supports the standby side roll such that the speed of the outer peripheral surface of the standby side roll matches the conveyance speed of the sheet of the supply side roll. Further, the unit control unit 5g specifies the timing for starting the movement of the pressing roller 4e at which the pressing roller 4e is pressed to the pressing position at the pressing timing, on the basis of the information on the position of the pressing roller 4e obtained from the unit drive source 4c3 and the pressing timing determined by the adhesion member position determination unit 5i. Specifically, immediately before the joining operation of the sheets, the moving unit 4b is disposed at a splice preparation position (not shown) between the detectable position P2 shown in FIG. 12 and the control switching position P3 shown in FIG. 13, the position control and the torque control of the unit drive source 4c3 from the splice preparation position are executed, thereby the pressing roller 4e is pressed to the pressing position P1 as shown in FIG. 14. Therefore, the unit control unit 5g determines the timing for starting the movement of the pressing roller 4e on the basis of the movement time of the pressing roller 4e from the splice preparation position to the pressing position P1 and the pressing timing. In addition, the unit control unit 5g starts moving the pressing roller 4e (driving the unit drive source 4c3) when the timing arrives. The pressing timing includes not only the timing when the adhesion member H arrives at the pressing position P1, but also the timing when the sheet positioned slightly upstream from the adhesion member H in the rotation direction of the standby side roll arrives at the pressing position P1. That is, the timing for starting the movement of the pressing roller is set for the purpose of joining the sheet of the supply side roll to the sheet of the standby side roll at the same time as or immediately after the pressing by the pressing roller 4e.

The shaft control unit 5e executes the control to adjust the sheet feeding quantity from the supply side roll according to the change in the tension of the sheet due to the change in a path length of the sheet on the supply roll when the rotation member 3b is rotated between the mounting position (see FIG. 1) and the splice position (see FIG. 11). Specifically, the shaft control unit 5e reduces the feeding quantity when the path length of the sheet is shortened, and increases the feeding quantity when the path length of the sheet extends. The path length is changed according to the following three factors. The first factor is a rotation angle of the rotation member 3b, the second factor is an outer diameter dimension of the supply side roll, and the third factor is the position of the moving unit 4b. The characteristics of the feeding quantity for these three factors are determined in advance, a map showing these characteristics is stored in the storage area 5b, and the feeding quantity is determined by using the map and the detected values of the three factors. During the rotation operation of the rotation member 3b, the shaft control unit 5e can use only the maps related to the first factor and the second factor. Further, while the moving unit 4b is moving, the shaft control unit 5e can use the map related to the third factor until the pressing roller 4e is pressed against the standby side roll. While the moving unit 4b is moving, the shaft control unit 5e can use the map related to the second factor (outer diameter dimension of a new supply roll) and the third factor after the pressing roller 4e is pressed against the standby side roll. Note that in the relationship with the disposition of the guide rollers 3r to 3u (see FIG. 1) in the support mechanism 3 of the present embodiment, the change in the path length is the largest within the predetermined angle range based on the state in which the rotation member 3b is rotated horizontally (the state in which one support shaft is disposed at the splice position). Therefore, the speed of the shaft control unit 5e is lower when the rotation member 3b is rotated within the above angle range than when the rotation member 3b is rotated within another angle range.

The remaining quantity calculation unit 5j calculates the remaining quantity of the sheet of the roll by using a thickness t of the sheet on the roll stored in the storage area 5b, a final diameter Df of the roll stored in the storage area 5b when the supply of the sheet is completed, a supply length L of the sheet supplied from the roll per rotation at the time of calculation, and a rotation speed v of the support shaft obtained from the shaft control unit 5e. The final diameter Df of the roll is a diameter of a core for a roll having a core, or the diameter of the support shaft for a roll without the core. In addition, the supply length L of the sheet is calculated, for example, from the rotation speed (peripheral speed) of the motor-driven roller 2l and the rotation speed v of the support shaft shown at the bottom of FIG. 1

Specifically, the remaining quantity calculation unit 5j calculates a current diameter Dp of the roll by dividing the supply length L of the sheet per rotation by $\pi$. Further, the remaining quantity calculation unit 5j may calculate the diameter Dp in consideration of a change in a conveyance path length of the sheet by the tension control roller 2l shown in FIG. 1. Then, the remaining quantity of the sheet is calculated based on the following equation (1).

$$[(Dp+Df)/2\times\pi]\times[(Dp-Df)/2t] \qquad (1)$$

Here, the first [ ] is for calculating an average diameter of one round of the sheet wound around a plurality of times, and the last [ ] is the number of times of winding. According to Equation (1), the remaining quantity of the sheet can be calculated (estimated) by multiplying the number of windings by a circumference of the average diameter. Note that the thickness t of the sheet may be calculated by dividing a decrease value per rotation of the diameter Dp of the roll that is decreasing for each rotation of the roll by two. In addition, the remaining quantity calculation unit 5j can also calculate (estimate) the remaining quantity of the sheet using a mass of the standby side roll.

As described later, the controller 5 starts an operation for joining the sheet of the standby side roll when the remaining quantity of the sheet of the supply side roll calculated by the remaining quantity calculation unit 5j becomes equal to or less than the preset remaining quantity of the sheet. Here, the preset remaining quantity of the sheet is a remaining quantity of sheet of the supply roll when the preparation operation for joining the sheet of the standby side roll to the sheet of the supply roll is started, and is set by adding the following three times required for the preparation operation to the remaining quantity of the sheet of the supply side roll remaining after the joining operation is completed. A first time is a time from the start of the rotation of the standby side roll until the rotation speed arrives at the sheet conveyance speed. A second time is a time from the start of the advance of the moving unit 4b for pressing the pressing roller 4e to the pressing position P1 until the pressing roller 4e arrives at the pressing position P1. A third time is a time until the rotation of the roll which was the supply side roll stops after the sheets are joined. The remaining quantity of the sheet is set using a value obtained by adding a value obtained by multiplying the conveyance speed of the sheet by the first time and the second time, and a value obtained by multiplying the circumference of the roll by the number of rotations of the roll which was the supply roll during the third time. The standby side roll may be rotated in advance at a predetermined speed before the preparation operation, and in this case, the remaining quantity of the sheet can be set without considering the first time.

The cutter control unit 5k outputs an operation command to the cutter drive source 4f4, thereby driving the cutting blade 4f2 between a non-cutting position indicated by a solid line and a cutting position indicated by a two-dot chain line in FIG. 8. In addition, the cutter control unit 5k sets the driving timing for driving the cutting blade 4f2 to the cutting position based on the above-described pressing timing determined by the unit control unit 5g. For example, the cutter control unit 5k drives the cutting blade 4f2 to the cutting position immediately after the pressing timing (for example, after 60 milliseconds), and holds the cutting blade 4f2 at the cutting position for a predetermined period (for example, 60 milliseconds).

The urging force control unit 5l outputs the operation command to the urging force generation source 4j2, thereby switching the urging mechanism 4j to a supply state in which compressed air blows from the air nozzle 4j1 according to the cutting timing of the sheet by the cutter 4f. Specifically, the urging force control unit 5l sets the urging mechanism 4j in the supply state during a predetermined period including the cutting timing of the sheet. Further, the urging force control unit 5l may control the urging mechanism 4j such that the urging mechanism 4j is in the supply state during a period from before the predetermined time of the cutting timing to after the lapse of the predetermined time. In the present embodiment, the urging force control unit 5l switches the urging mechanism 4j from the stop state to the supply state simultaneously with the driving timing of the cutter blade 4f2 by the cutter control unit 5k, and maintains the supply state for the predetermined period (for example, 100 seconds). The urging force control unit 5l sets the switching timing of the urging mechanism 4j based on the above-described pressing timing determined by the unit control unit 5g.

The discharge control unit 5m outputs an operation command to the discharge drive source 2k to control the discharge mechanism between a non-discharge position indicated by a solid line and a discharge position indicated by a two-dot chain line in FIG. 6.

The revolution control unit 5h controls the revolution drive source 4q such that the adhesion member detector 4d moves between the detected position (see FIG. 12) and the retracted position (see FIG. 13).

Hereinafter, the processing executed by the controller 5 will be described with reference to FIGS. 18 to 22. In the following description, a case in which the current sheet is supplied from the roll R1 supported by the support shaft 3c and a new roll R2 is mounted on the support shaft 3d, that is, a case in which the roll R1 is the supply side roll and the roll R2 is the standby side roll will be described. In addition, it is assumed that the support shaft 3c is rotatably driven at the stage before the execution of the processing shown in FIG. 19, and thus the sheet of the supply side roll R1 is supplied.

Referring to FIG. 19, when the input operation unit 6 is operated by a worker to allow the sheet supply device 1 to perform the joining operation of the sheet, the rotation member 3b is rotated such that the support shaft 3d is disposed at the mounting position shown in FIG. 1 (step S1). A worker mounts a new standby side roll R2 on the support shaft 3d rotated to the mounting position in this way.

After the new standby side roll R2 is mounted, when the input operation unit 6 for inputting the completion of the mounting by the worker is operated (YES in step S2), the rotation member 3b is rotated such that the support shaft 3d is disposed at the splice position shown in FIG. 11 (step S3).

In this state, the standby side roll R2 is rotated (step S4). Further, the outer diameter detector 4a starts detecting the outer diameter of the standby side roll R2, the rotation of the standby side roll R2 is stopped at the timing when the outer diameter of the standby side roll R2 is detected during one rotation of the standby side roll R2, and the average value of the outer diameter of the standby side roll R2 is calculated on the basis of the detection value of the outer diameter (step S5).

It is determined whether or not the average value of the outer diameter of the standby side roll R2 calculated in this way is within a predetermined standard range (step S6). Here, if it is determined that the average value is out of the standard range (NO in step S6), the rotation member 3b is rotated such that the support shaft 3d is disposed at the mounting position shown in FIG. 1 (step S7), and the process returns to the above-described step S2. That is, when the outer diameter of the standby side roll R2 is out of the standard range, the standby side roll R2 is not used to be replaced with (mounted on) another standby side roll R2 after the support shaft 3d is disposed at the mounting position.

On the other hand, if it is determined that the average value of the outer diameter of the standby side roll R2 is within the standard range (YES in step S6), the moving unit 4b moves to a position for detection by the outer diameter detector 4a and the adhesion member detector 4d (step S8).

Specifically, in step S8, the detectable position is calculated on the basis of the average value of the outer diameter of the standby side roll R2 calculated in step S5. Further, when the position of the moving unit 4b corresponding to the detectable position is closer to the standby side roll R2 than the retracted position shown in FIG. 1, the moving unit 4b moves to a position corresponding to the detectable position P2 (FIG. 12). On the other hand, when the position of the moving unit 4b corresponding to the detectable position is the retracted position or is farther from the standby side roll R2 than the retracted position, the moving unit 4b waits at the retracted position.

Next, the adhesion member detector 4d is rotated from the retracted position shown in FIG. 10 to the detected position shown in FIGS. 11 and 12 (step S9), and the rotation of the standby side roll R2 is started (step S10), and in this state, the position of the adhesion member H in the rotation direction of the standby side roll R2 is detected by the adhesion member detector 4d (step S11).

The rotation of the standby side roll R2 stops such that the adhesion member H is disposed within the detection range of the outer diameter detector 4a as indicated by a two-dot chain line in FIG. 12 (such that the adhesion member H is positioned within the range that intersects the detection axis D1) on the basis of the detected position of the adhesion member H in the rotation direction (step S12).

In this state, the outer diameter of the adhesion member H in the standby side roll R2 is detected by the outer diameter detector 4a (step S13).

Next, as shown in FIG. 13, the adhesion member detector 4d moves to the retracted position (step S14), and the moving unit 4b advances to the splice preparation position (step S15). Here, the splice preparation position is a position between the detectable position P2 shown in FIG. 12 and the control switching position P3 shown in FIG. 13, and is a position preset as a position where the pressing roller 4e does not come into contact with the standby side roll R2 even if the outer diameter of the standby side roll R2 varies in the rotation direction. For example, the splice preparation position is the position of the moving unit 4b where the distance from the pressing roller 4e to the outer diameter of the standby side roll R2 is 50 mm.

Next, the remaining quantity of the supply side roll R1 is calculated (step S16), and it is determined whether the remaining quantity is equal to or less than the preset remaining quantity (predetermined quantity) (step S17).

If it is determined in step S17 that the remaining quantity is not equal to or less than the predetermined quantity, the remaining quantity of the supply side roll R1 is repeatedly calculated based on the rotation speed v of the support shaft 3c and the conveyance speed of the sheet (step S16), and it is determined whether the remaining quantity is equal to or less than the predetermined quantity (step S17).

Here, if it is determined that the remaining quantity is equal to or less than the predetermined quantity, the rotation of the standby side roll R2 is started so as to have the same speed as the conveyance speed of the sheet of the supply side roll R1 (step S18).

In step S19, the driving timings of the moving unit 4b, the cutter 4f, and the urging mechanism 4j are set. Specifically, the unit control unit 5g sets the driving timing of the moving unit for pressing the pressing roller 4e to the pressing position P1 via the adhesion member H. The cutter control unit 5k sets the driving timing for driving the cutting blade 4f2 to the cutting position according to the pressing timing of the pressing roller 4e. Further, the urging force control unit 5l sets the driving timing of the urging mechanism 4j that blows out the compressed air according to the sheet cutting timing.

Next, it is determined whether or not the driving timing of the moving unit 4b has come (step S20), and if it is determined that the driving timing has arrived, the moving unit 4b advances from a splice standby position (not shown) by position control (step S21).

When the moving unit 4b starts advancing in step S21, it is determined whether the moving unit 4b has arrived at the control switching position P3 shown in FIG. 13 (step S22).

Here, if it is determined that the moving unit 4b has not arrived at the control switching position P3, the moving unit 4b continues to advance by the position control, while if it is determined that the moving unit 4b has arrived at the control switching position P3, the control for advance of the moving unit 4b is switched to the torque control (step S23).

In parallel with steps S20 to S23, it is determined whether or not the driving time of the cutter 4f has come (step S24).

Here, if it is determined that the driving time of the cutter 4f has arrived, the cutter 4f is driven to the cutting position (step S25). Thereby, the sheet of the supply side roll R1 is cut, and the supply of the sheet of the standby side roll R2 is started.

In parallel with steps S20 to S23 and steps S24 to S25, it is determined whether or not the driving time of the urging mechanism 4j has come (step S26).

If it is determined that the driving time of the urging mechanism 4j has arrived, the urging mechanism 4j applies the urging force (step S27). Thereby, after the sheet of the supply side roll R1 is cut by the cutter 4f, the remaining portion of the sheet is urged in a direction (downward) away from the pressing roller 4e to be able to prevent the sheet from being caught in a supply path of the sheet.

After executing the processes related to steps S20 to S23, steps S24 to S25, and steps S26 to S27, it is determined whether or not the movement of the moving unit 4b to the pressing position, the driving of the cutter 4f to the cutting position, and the application of the urging force from the urging mechanism 4j are completed, in other words whether or not the joining operation is completed (step S28).

If it is determined in step S28 that the joining operation is not completed, the process waits for the completion of all the processes in steps S20 to S27, while if it is determined that the joining operation is completed, the role setting is changed (step S29). Specifically, in step S29, the roll R1 is set as the next standby side roll, and the roll R2 is set as the next supply side roll.

Next, the moving unit 4b retracts by the torque control (step S30), and when the moving unit 4b arrives at the control switching position P3 (see FIG. 13) (YES in step S31), the moving unit 4b is temporarily stopped (step S32).

Then, the moving unit 4b retracts by the position control (step S33), and when the moving unit 4b arrives at the retracted position (see FIG. 1) (YES in step S34), the moving unit 4b is stopped (step S35).

Further, in parallel with the steps S30 to S35, the cutter 4f is driven at the non-cutting position (step S36), the rotation of the support shaft 3c is stopped (step S37), and the application of the urging force is stopped (step S38).

Then, it is determined whether or not all the processes in steps S30 to S38 are completed (step S39). Here, if it is determined that some of the processes in steps S30 to S38 are not completed, the process waits until all the processes in steps S30 to S38 are completed.

On the other hand, if it is determined in step S39 that all the processes in steps S30 to S38 are completed, the support shaft 3c is reversed by a predetermined angle (step S40). Thereby, the remaining portion of the sheet cut by the cutter 4f is wound around the support shaft 3c from the state shown in FIG. 15, as shown in FIG. 16.

Next, the rotation member 3b in the state of FIG. 16 is rotated clockwise in FIG. 16 about the rotation shaft 3a, so the support shaft 3d is disposed at the mounting position (see FIG. 1) (step S41).

In this state, as shown in FIG. 6, the discharge mechanism is driven from the non-discharge position indicated by a solid line to the discharge position indicated by a two-dot chain line (step S42). Thereby, the roll R1 is discharged from the support shaft 3c disposed at the mounting position, and then, a worker is allowed to attach a new roll. Then, the process returns to step S2.

As described above, as shown in FIG. 8, the pressing roller 4e and the second guide roller 4h are fixed to the common moving unit 4b. Therefore, the pressing roller 4e can be pressed against the pressing position P1 of the standby side roll R2 without changing the relative position between the pressing roller 4e and the second guide roller 4h. As a result, the separating angle θ2 formed by the sheet guided from the pressing roller 4e to the guide roller 4h and the tangential line C1 at the pressing position P1 of the standby side roll R2 can be made constant regardless of the difference in the diameter dimension of the standby side roll R2.

Therefore, according to the present invention, the precision of the sheet separating operation can keep constant regardless of the differences in the diameter dimensions of the rolls R1 and R2.

The end portion of the sheet of the standby side roll R2 can be reliably separated from the outer peripheral surface of the standby side roll while the sheet of the supply side roll R1 smoothly contacts the outer peripheral surface of the standby side roll R2.

The sheet of the supply side roll R1 is guided between the standby side roll R2 and the pressing roller 4e from the lower side of the standby side roll R2 by the first guide roller 4g and the sheet of the supply side roll R1 is cut below the center (center of the support shaft 3d) of the standby side roll R2. Therefore, the end portion of the cut sheet of the supply roll R1 falls below the standby side roll R1, thereby preventing the sheet of the supply side roll R1 from being caught in the standby side roll R2.

The urging mechanism 4j can supply a downward force to a portion positioned below the cutter 4f on the sheet of the supply side roll R1 in accordance with the timing at which the cutter 4f is operated to the cutting position. Therefore, it is possible to reliably prevent the end portion of the sheet of the supply side roll R1 from being drawn between the pressing roller 4e and the standby side roll R2 by the airflow due to the rotation of the standby side roll R2 and the inertia of the supply side roll R1.

Figure 23:
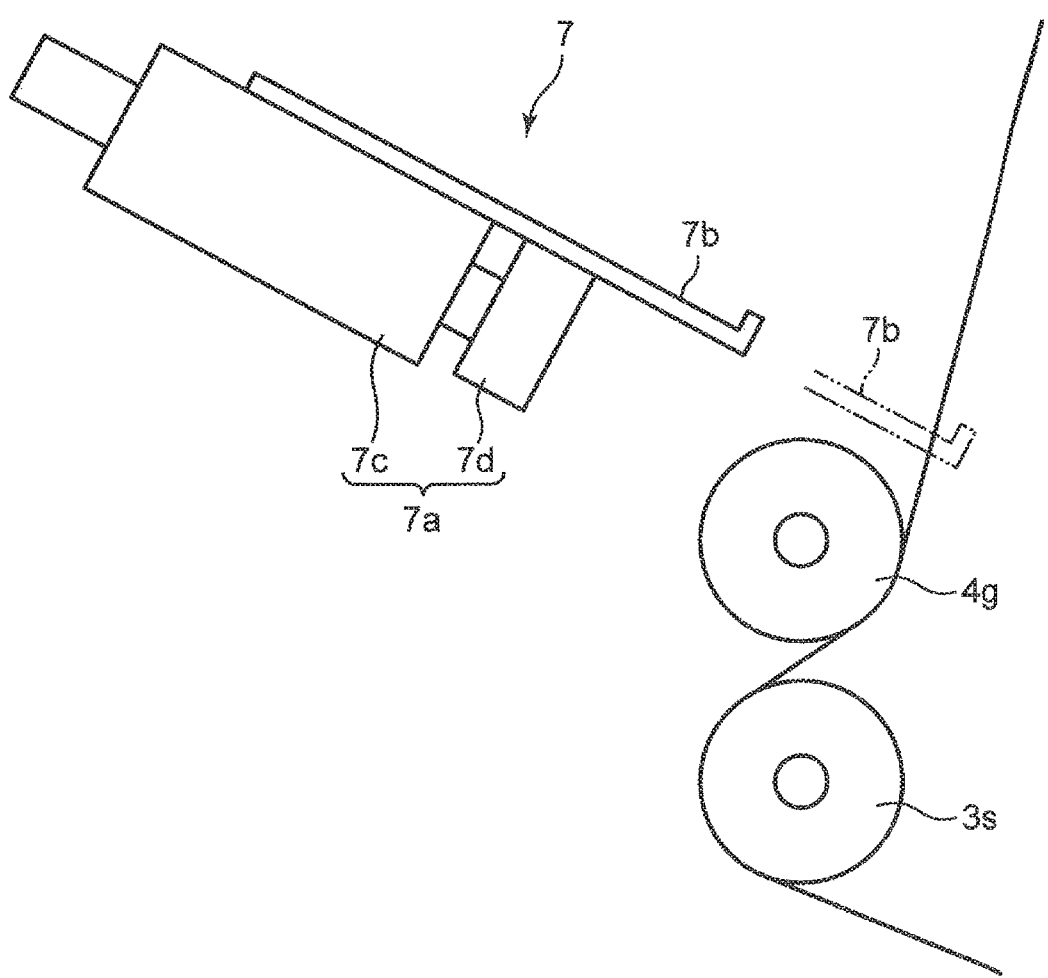
FIG. 23 is a partially enlarged front view showing an urging mechanism according to another embodiment.

In addition, in the above embodiment, although the structure which blows out the compressed air is employed as the urging mechanism 4j, the urging mechanism 4j is not limited to the structure of the above embodiment. For example, as shown in FIG. 23, the urging mechanism 7 that presses the sheet mechanically may be employed as the urging mechanism 4j.

Specifically, the urging mechanism 7 includes an air cylinder 7a attached to the moving unit 4b and a pressing plate 7b for pressing a sheet.

The air cylinder 7a has a cylinder main body 7c fixed to the moving unit 4b, and a rod 7d displaceable with respect to the cylinder main body 7c, and the rod 7d can be expanded and contracted with respect to the cylinder main body 7c by supplying the compressed air from the urging force generation source (not shown).

The pressing plate 7b is fixed to the rod 7d so as to follow the expansion and contraction of the rod 7d.

As described above, the urging mechanism 7 controls the supply and exhaust of the compressed air from the urging force generation source (not shown), and as a result, is configured to be switchable between a supply state (state indicated by a two-dot chain line in FIG. 23) in which a force is applied to the sheet in a direction away from the pressing position P1 (see FIG. 8) and a stop state in which the application of the force is stopped.

Hereinafter, a sheet supply method using the above-described sheet supply device 1 will be described. Hereinafter, the case where the roll R1 in FIG. 1 is the supply side roll and the roll R2 is the standby side roll will be described.

The sheet supply method includes a mounting step, a supply step, a splice preparation step, and a joining step.

In the mounting step, the standby side roll R2 is mounted on the support shaft 3d mounted at the mounting position shown in FIG. 1.

In the supply step, prior to the mounting step, the sheet of the supply side roll R1 supported at the center position by the support shaft 3c is supplied by the driving of the shaft drive source 4l.

In the splice preparation step, when the remaining quantity of the sheet of the supply side roll R1 is equal to or less than the preset remaining quantity, the rotation member 3b is rotated such that the support shaft 3d is disposed at the splice position as shown in FIG. 11.

Figure 21:
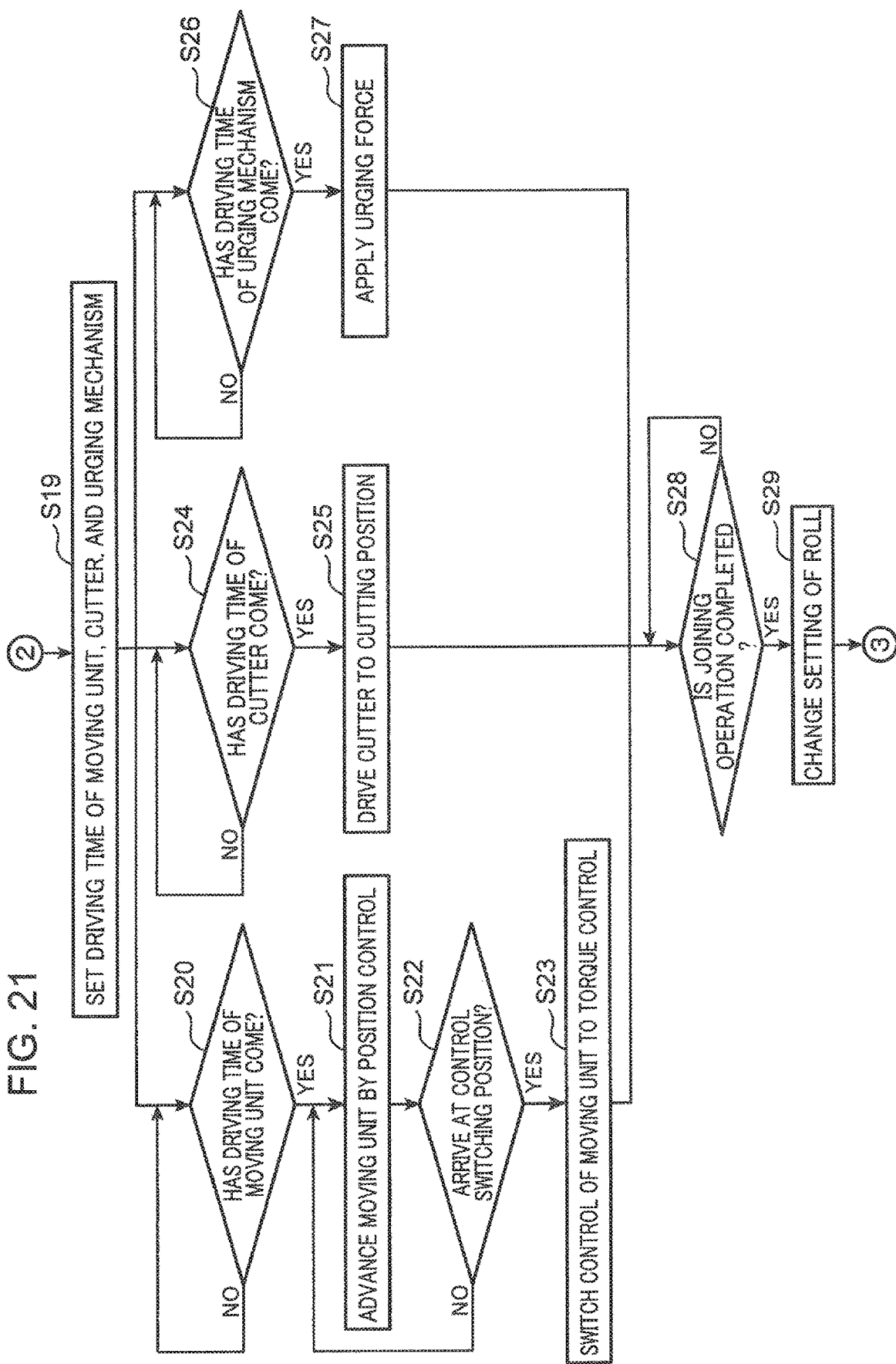
FIG. 21 is a flowchart showing the process executed by the controller in FIG. 18.
Figure 22:
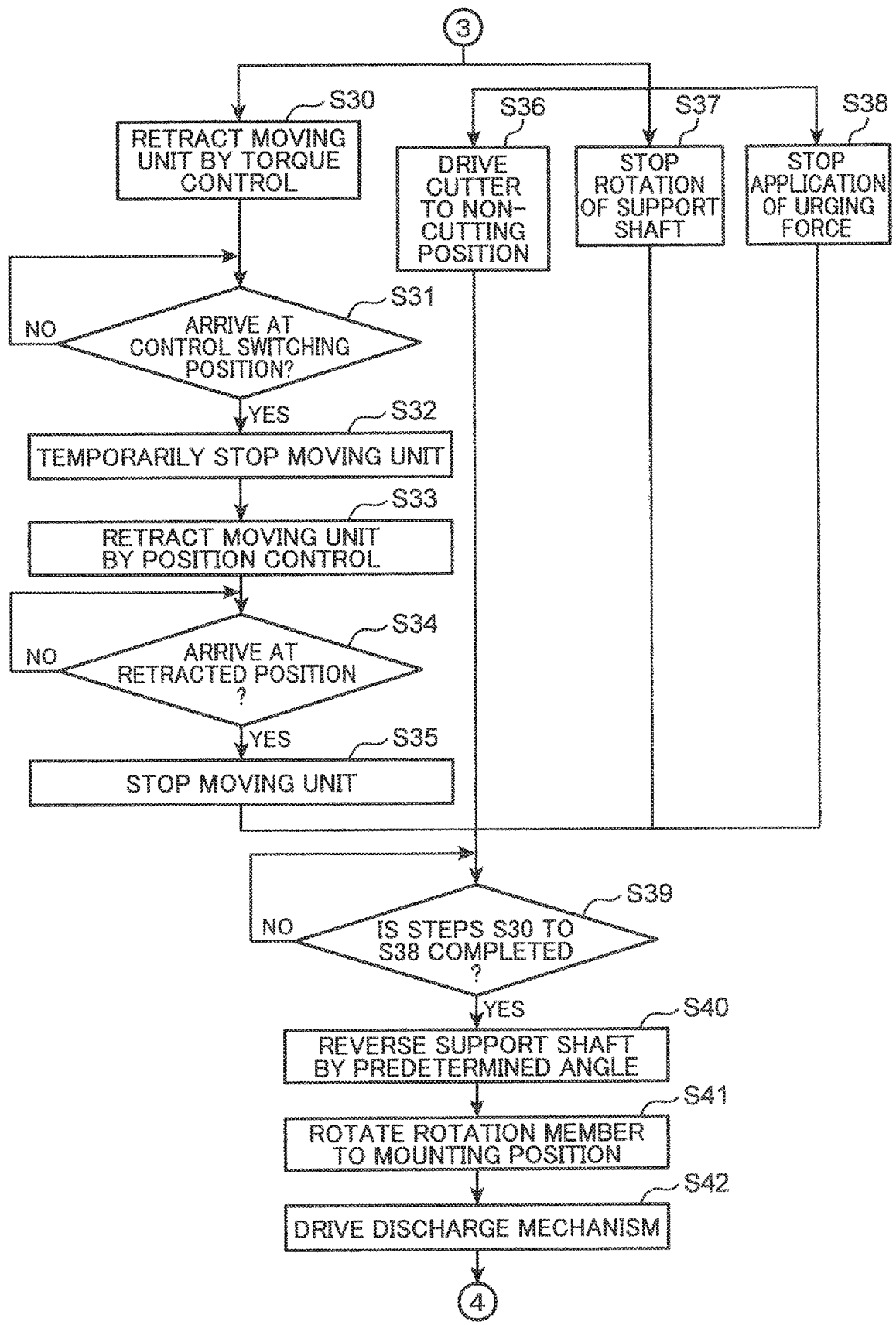
FIG. 22 is a flowchart showing the process executed by the controller in FIG. 18.

In the joining step, in a state after the splice preparation step is performed, as shown in FIG. 14, the pressing roller 4e moves such that the center of the pressing roller 4e moves on the straight line passing through the center of the rotation shaft 3a and the center of the support shaft 3d disposed at the splice position by the joining mechanism 4 (steps S20 to S23 in FIG. 21). As a result, the sheet of the supply side roll R1 is pressed against the outer peripheral surface of the standby side roll R2, and the sheet of the standby side roll R2 is joined to the sheet of the supply side roll R1. Then, in the joining step, as indicated by a two-dot chain line in FIG. 8, after the sheet of the supply side roll R1 is joined to the sheet of the standby side roll R2, the sheet of the supply side roll R1 is cut by the cutter 4f.

Further, in the joining process, the position control of the unit drive source 4c3 is executed in the state in which the pressing roller 4e is positioned in the area farther away from the standby side roll R2 than the control switching position P3 (see FIG. 13) away from the outer peripheral surface of the standby side roll R2 by a predetermined distance while the standby side roll R2 is rotated by the shaft drive source (second shaft drive source) 4k. On the other hand, in the joining step, the torque control of the unit drive source 4c3 is executed in the state in which the pressing roller 4e is positioned in the area from the control switching position P3 to the outer peripheral surface of the standby side roll R2, thereby pressing the pressing roller 4e against the outer peripheral surface of the standby side roll R2 via the sheet of the supply side roll R1.

Thus, in the joining step, the moving unit 4b moves in a direction approaching the standby side roll R2. As a result, as shown in FIG. 8, the second guide roller 4h fixed to the moving unit 4b is disposed on the opposite side to the standby side roll R2 based on the tangential line C1 with respect to the outer peripheral surface of the standby side roll R2 at the pressing position P1. Thereby, the sheet is guided such that the sheet is guided from the pressing roller 4e in a direction away from the standby side roll R2.

Further, in the joining step, as shown in FIG. 8, by moving the moving unit 4b in the direction approaching the standby side roll R2, the pressing roller 4e is pressed against the pressing position, and the sheet drawn from the supply side roll R1 on the upstream side of the pressing position P1 in the conveyance direction of the sheet is guided to the pressing position P1 by the first guide roller 4g. Further, the force in the direction away from the pressing position P1 is applied to the portion of the sheet of the supply side roll R1 on the upstream side in the conveyance direction with respect to the cutting position by the cutter 4f according to the sheet cutting timing by the cutter 4f.

Although the example in which the supply step is performed prior to the mounting step has been described, for example, when the sheet supply device 1 is started, the mounting step may be performed before the supply step.

Note that the present invention is not limited to the above embodiment, and for example, the following aspects can be adopted.

In the above embodiment, although the double-sided tape is illustrated as the adhesion member H, the adhesion member H is not limited to the double-sided tape, and is provided on the outer peripheral surface of the standby side roll, and may allow the adhesion from the outside of the sheet of the supply side roll while fastening an end of the sheet on the outer peripheral surface of the standby side roll. For example, the adhesion member H does not have a base material such as a tape, but may be an adhesive. Further, a tape having a delamination structure in which a plurality of layers are laminated so as to be peelable and which has an adhesive material on both front and back surfaces thereof can also be adopted. Specifically, the tape having the delamination structure is stuck on the outer peripheral surface of the standby side roll, and the end portion of the sheet is bonded to the outer surface of the tape so that a part of the outer surface of the tape is exposed. In this state, by pressing the sheet of the supply side roll against the exposed portion of the tape, an outermost layer of the tape having the delamination structure is peeled from an inner layer thereof, and thus the sheets can be joined.

In the above embodiment, although the configuration in which the support shafts 3c and 3d are provided at every 180° about the rotation shaft 3a with respect to the rotation member 3b has been described, the number of support shafts to be attached to the rotation member 3b is not limited to two, but may be in plural. For example, it is also possible to apply the rotation member 3b provided with three support shafts every 120° about the rotation shaft 3a.

Although the configuration in which the moving unit 4b moves in a horizontal direction has been described, the moving direction of the moving unit 4b is not limited to the horizontal direction. For example, the moving unit 4b can be configured to move in a vertical direction or in a direction inclined with respect to the horizontal direction and the vertical direction. However, it is preferable to set the movement path of the moving unit 4b such that a space for the remaining portion of the sheet cut by the cutter 4f to fall can be formed below the moving unit 4b.

Although the support shafts 3c and 3d supported (extending in the Y direction from the rotation member 3b) in a cantilever manner with respect to the rotation member 3b have been described, both ends of the support shafts 3c and 3d may be supported. However, as in the above embodiment, since one end of each of the support shafts 3c and 3d is a free end, the rolls R1 and R2 can be easily mounted from the free end.

Although the urging mechanism 4j (FIG. 8) for blowing the compressed air and the urging mechanism 7 (FIG. 23) for pressing the pressing plate 7b have been described, the urging mechanism is not limited to these configurations. For example, the drive source for rotating the guide roller (for example, the first guide roller 4g in FIG. 8) in a direction opposite to the conveyance direction of the sheet is applied as the urging mechanism, the guide roller being provided on the upstream side of the cutter 4f in the conveyance path of the sheet.

The configuration in which the cutter 4f is driven to the cutting position immediately after the pressing timing of the pressing roller 4e to the pressing position P1 has been described, but the timing of driving the cutter 4f to the cutting position is not limited thereto. For example, the cutter 4f can be driven to the cutting position simultaneously with the pressing timing. Thereby, after the joining operation, the length of the portion following the sheet of the standby side roll in the sheet of the supply side roll can be shortened.

Although the configuration in which the average value of the outer diameter is calculated based on the result of detection from the outer diameter detector 4a while the standby side roll is rotated once has been described, the method of calculating the outer diameter of the standby side roll is not limited thereto. For example, in the state in which the rotation of the standby side roll is stopped, the outer diameter of the standby side roll at one location in a circumferential direction may be calculated based on the result of detection from the outer diameter detector 4a. Further, when the average value of the outer diameter is calculated, the rotation range of the standby side roll is not one rotation but may be shorter (for example, shortened to a half rotation) than the one rotation.

Although the configuration in which the pressing roller 4e and the adhesion member detector 4d are each attached to the common moving unit 4b has been described, the pressing roller 4e and the adhesion member detector 4d may be attached to different configurations that can be contact with and separated from the standby side roll.

Although the example in which the detection axis D2 (see FIG. 12) of the adhesion member detector 4d is disposed perpendicular (perpendicular to the support shafts 3c and 3d) to the outer peripheral surface of the standby side roll has been described, the detection axis D2 may not be disposed perpendicular to the standby side roll.

Furthermore, the example in which the adhesion member detector 4d is rotatable between the detected position (see FIG. 12) and the retracted position (see FIG. 13) by the revolution member 4n has been described, but the attachment method of the adhesion member detector 4d is not limited thereto. For example, the adhesion member detector 4d may be fixed at a position where the detection axis D2 intersects the outer peripheral surface of the standby side roll under the premise that the adhesion member detector 4d is disposed at a position deviating from the movement path of the pressing roller 4e.

In the above embodiment, when the moving unit 4b moves to the control switching position P3, the switching from the position control to the torque control is performed without stopping the moving unit 4b (steps S21 to S23 in FIG. 21), but the control of the moving unit 4b is not limited thereto. For example, it is also possible to stop the moving unit 4b at the control switching position P3 and then perform the switching from the position control to the torque control.

In the above embodiment, the switching timing from the position control to the torque control is calculated while the moving unit 4b is waiting at the splice preparation position (not shown) (step S15 in FIG. 20 and step S19 in FIG. 21), but the calculation time of the switching timing is not limited thereto. For example, under the premise that the pressing roller 4e is temporarily stopped when the pressing roller 4e arrives at the control switching position P3, the start timing of the torque control may be determined when the pressing roller 4e arrives at the control switching position P3.

In the above embodiment, the configuration in which the sheet of the supply side roll (the roll R1 in FIG. 11) is guided between the standby side roll and the pressing roller 4e through below the standby side roll (the roll R2 in FIG. 11) has been described, but the path for guiding the sheet to the pressing position P1 is not limited thereto. For example, the configuration in which the sheet of the supply side roll is guided between the standby side roll and the pressing roller 4e though over the standby side roll may be employed.

In the embodiment, as shown in FIG. 8, in the moving unit 4b, the first guide roller 4g is provided on the upstream side of the pressing position P1 in the conveyance direction of the sheet, but the second guide roller 4*h* is provided on the downstream side of the pressing position P1. The angle θ1 formed by the sheet from the first guide roller 4*g* to the pressing position P1 and the tangential line C1 is smaller than the angle θ2 formed by the sheet from the pressing position P1 to the second guide roller 4*h* and the tangential line C1. However, the angle θ1 may be equal to or larger than the angle θ2.

The point where the urging mechanism 4*j* is switched from the stopped state to the supply state at the same time as the driving timing of the cutting blade 4*f*2 (steps S24 to S27) has been described. However, the switching of the urging mechanism 4*j* from the stop state to the supply state according to the driving timing of the cutting blade 4*f*2 includes that the urging mechanism 4*j* is in the supply state during a predetermined period including the driving timing of the cutting blade 4*f*2, and after the driving of the cutting blade 4*f*2, the urging mechanism 4*j* is in the supply state during a predetermined period from timing before the remaining portion of the sheet of the supply side roll follows the sheet of the standby side roll and is caught in the conveyance path.

Although the configuration in which the force from the urging mechanism 4*j* is applied to the portion of the sheet opposite to the cutter 4*f* based on the first guide roller 4*g* on the sheet has been described, the position where the force from the urging mechanism 4*j* is applied may be a portion on the upstream side in the conveyance direction with respect to the cutting position of the sheet by the cutter 4*f*. For example, as shown in FIG. 23, the force from the urging mechanisms 4*j* and 7 can be applied to a position on the upstream side in the conveyance direction with respect to the cutting position by the cutter 4*f* and on the downstream side of the first guide roller 4*g*.

The configuration in which the distance from the portion of the sheet to which the force from the urging mechanism 4*j* is applied to the first guide roller 4*g* is set smaller than the distance from the first guide roller 4*g* to the cutting position by the cutter 4*f* has been described, but the distance is not particularly limited.

Although the urging mechanism 4*j* for applying a downward force to the sheet has been described, the direction of the force from the urging mechanism may be a direction away from the pressing position P1.

In the above embodiment, the distance from the portion of the sheet to which the force is applied by the urging mechanism 4*j* to the first guide roller 4*g* is smaller than the distance from the first guide roller 4*g* to the cutting position by the cutter 4*f*. However, the portion of the sheet to which the force from the urging mechanism 4*j* is applied may be positioned on the upstream side away from the first guide roller 4*g*. For example, the force from the urging mechanism 4*j* may be applied to a portion of a sheet on a further upstream side with respect to the guide roll 3*u*.

In order to obtain the result of detection from the outer diameter detector 4*a* in the state in which the position of the adhesion member H determined by the adhesion member position determination unit 5*i* is positioned within the detection range of the outer diameter detector 4*a*, the following process is executed in the embodiment.

On the basis of the position of the adhesion member H determined by the adhesion member position determination unit 5*i*, the driving of the shaft drive sources 4*k* and 4*l* is controlled by the shaft control unit 5*e* such that the adhesion member H is positioned within the detection range of the outer diameter detector 4*a*, and in this state, the outer diameter determination unit 5*f* determines the diameter at the position of the adhesion member H in the roll using the result of the outer diameter detector 4*a*.

Alternatively, the following process can be performed. The driving of the drive sources 4*k* and 4*l* is controlled in advance by the shaft control unit 5*e*, and the outer diameter for each rotation angle position of the roll is detected by the outer diameter detector 4*a* and stored in the storage area 5*b* (hereinafter, the stored outer diameter is referred to as outer diameter data). The outer diameter determination unit 5*f* can determine the outer diameter of the roll on the basis of the outer diameter data and the rotation angle position of the roll corresponding to the position of the adhesion member H determined by the adhesion member position determination unit 5*i*, and determine a partial outer diameter of the adhesion member H in the roll by using this outer diameter as the result of detection from the outer diameter detector 4*a* in the state in which the adhesion member H is positioned within the detection range of the outer diameter detector 4*a*.

Further, the movement of the cutter 4*f* is not limited to the movement by the rotation, and may be a movement (for example, linear movement) in a posture maintaining a predetermined angle with respect to the sheet.

The urging mechanism 4*j* may not be provided in the moving unit 4*b*. For example, the urging mechanism 4*j* may be provided on the base 2 or the support mechanism 3. In this case, in a state where the support shaft is disposed at the splice position, the urging mechanism 4*j* can be disposed at a position where a force can be applied to a portion on the upstream side in the conveyance direction of the sheet based on the guide roll 3*s*.

In addition, the example in which the pressing direction (direction along the detection axis D2) of the pressing roller 4*e* is disposed perpendicular to the outer peripheral surface of the standby side roll has been described, but the pressing direction may not be disposed perpendicular to the outer peripheral surface of the standby side roll (which may be the direction along a straight line that does not pass through the support shaft in the front view shown in FIG. 12). Specifically, the pressing roller 4*e* can be moved up and down.

Note that the specific embodiments described above mainly include inventions having the following configurations.

In order to solve the above problems, the present invention provides a sheet supply device for supplying a sheet from a first roll and a second roll around which the sheet is wound, the sheet supply device including: a first support shaft that supports the first roll at a center position thereof; a second support shaft that supports the second roll at a center position thereof; a joining mechanism that joins the sheet of the second roll to the sheet of the first roll when a remaining quantity of the sheet of the first roll is equal to or less than a preset remaining quantity in a state in which the sheet of the first roll is supplied; and a guide roller that guides the sheet drawn from the first roll, in which the joining mechanism includes a pressing roller that presses a middle part of the sheet between the first roll and the guide roller against a preset pressing position on an outer peripheral surface of the second roll, and a moving unit that supports the pressing roller such that the pressing roller is configured to approach and move away from the outer peripheral surface of the second roll between a forward position where the pressing roller is pressed against the pressing position and a retracted position where the pressing roller is away from the pressing position, the guide roller is disposed on an opposite side of the second roll with respect to a tangential line to the outer peripheral surface of the second roll at the pressing position in a state in which the pressing roller is pressed against the pressing position of the second roll, and guides the sheet such that the sheet is guided from the pressing roller in a direction away from the second roll, and furthermore is fixed to the moving unit so as to be configured to approach and move away from the second roll together with the pressing roller.

In addition, the present invention provides a sheet supply method for supplying a sheet from a first roll and a second roll around which the sheet is wound, the sheet supply method including: a first supply step of supplying the sheet of the first roll supported at a center position by a first support shaft; and a joining step of joining the sheet of the second roll to the sheet of the first roll using a joining mechanism that joins the sheet of the second roll to the sheet of the first roll when a remaining quantity of the sheet of the first roll is equal to or less than a preset remaining quantity in a state in which the sheet of the first roll is supplied, in which the joining mechanism includes a pressing roller that presses a middle part of the sheet between a guide roller for guiding the sheet drawn from the first roll and the first roll against a preset pressing position on an outer peripheral surface of the second roll, and a moving unit that supports the pressing roller such that the pressing roller is configured to approach and move away from the outer peripheral surface of the second roll between a forward position where the press roller is pressed against the pressing position and a retracted position where the press roller is away from the pressing position, and in the joining step, by moving the moving unit in a direction approaching the second roll, the sheet is guided such that the sheet is guided from the pressing roller in a direction away from the second roll by pressing the pressing roller against the pressing position and disposing the guide roller fixed to the moving unit on an opposite side of the second roll with respect to a tangential line to the outer peripheral surface of the second roll at the pressing position.

According to the present invention, the pressing roller and the guide roller are fixed to a common moving unit. Therefore, the pressing roller can be pressed against the pressing position of the second roll without changing the relative position of the pressing roller and the guide roller. As a result, the separating angle formed by the sheet guided from the pressing roller to the guide roller and the tangential line at the pressing position of the second roll can be made constant regardless of the difference in the diameter dimension of the second roll.

Therefore, according to the present invention, the precision of the sheet separating operation can keep constant regardless of the differences in the diameter dimensions of the rolls.

Here, in order to keep the angle of the sheet guided between the second roll and the pressing roller with respect to the tangential line constant regardless of the difference in the diameter dimension of the second roll, it is considered to fix another guide roller to the upstream part of the pressing position in the sheet conveyance direction in the moving unit. In this case, the angle formed by the sheet from another guide roller to the pressing position and the tangential line may be equal to or greater than the angle formed by the sheet from the pressing position to the guide roller and the tangential line.

However, since the sheet supply device can be configured to be compact by making another guide roller that guides the sheet of the first roll close to the tangential line, it is preferable that the sheet of the first roll guided to the pressing position forms a relatively small angle with the tangential line. On the other hand, it is preferable that the sheet guided from the pressing position to the guide roller forms a relatively large angle with the tangential line in order to reliably separate the end portion of the sheet of the second roll from the outer peripheral surface of the second roll.

Therefore, the sheet supply device further includes another guide roller that guides the sheet such that the sheet is guided from the another guide roller to the pressing position in a direction approaching the second roll and is fixed to the moving unit so as to be configured to approach and move away from the second roll together with the pressing roller, the another guide roller being provided on the opposite side to the second roll with respect to the tangential line to the outer peripheral surface of the second roll at the pressing position and on an opposite side to the guide roller with respect to the plane including the pressing position and the center of the pressing roller in the state in which the pressing roller is pressed against the pressing position of the second roll, in which the angle formed by the sheet guided from the pressing position to the guide roller and the tangential line is preferably greater than the angle formed by the sheet guided from the another guide roller to the pressing position and the tangential line.

According to this aspect, it is possible to reliably separate the end portion of the sheet of the second roll from the outer peripheral surface of the second roll while smoothly bringing the sheet of the first roll into contact with the outer peripheral surface of the second roll.

In the sheet supply device, the sheet of the first roll can be cut after the sheet of the first roll is joined to the sheet of the second roll between the second roll and the pressing roller. Here, when the sheet of the first roll is guided between the pressing roller and the second roll by passing over the second roll, there is a possibility that when the sheet of the first roll is cut, the end portion of the sheet falls due to the action of gravity and is mounted on the second roll, and is caught in the second roll.

Therefore, the sheet supply device further includes a cutter that is configured to cut the sheet of the first roll between the another guide roller and the pressing roller and is fixed to the moving unit, in which it is preferable that the moving unit supports the pressing roller such that the center of the pressing roller and the center of the second support shaft are positioned on the same plane, and the pressing roller is movable in the horizontal direction, the guide roller is disposed above the pressing roller, and the another guide roller and the cutter are disposed below the pressing roller.

According to this aspect, the sheet of the first roll is guided between the second roll and the pressing roller from the lower side of the second roll by another guide roller, and the sheet of the first roll is cut at a position below the center of the second roll (the center of the second support shaft). Therefore, the end portion of the cut sheet of the first roll falls below the second roll, thereby preventing the sheet of the first roll from being caught in the standby side roll.

Here, even when the sheet of the first roll is cut at a position below the center of the second roll as in the above aspect, there is a possibility that the end portion of the sheet of the first roll is drawn between the pressing roller and the second roll by the airflow due to the rotation of the second roll and the inertia of the first roll.

Therefore, the sheet supply device further includes an urging mechanism that is switchable between a supply state in which a downward force is supplied to a portion positioned below the cutter on the sheet of the first roll and a stop state in which the supply of the downward force is stopped, and a controller that performs control to switch the urging mechanism from the stop state to the supply state, in which it is preferable that the cutter is fixed to the moving unit in a state in which the cutter can be moved between a non-cutting position separated from the sheet and a cutting position where the sheet is cut, and the controller switches the urging mechanism from the stop state to the supply state in accordance with the timing when the cutter is operated to the cutting position while operating the cutter from the non-cutting position to the cutting position when the remaining quantity of the sheet of the first roll becomes equal to or less than a preset remaining quantity.

According to the aspect, the urging mechanism can supply the downward force to the portion positioned below the cutter on the sheet of the first roll in accordance with the timing at which the cutter is operated to the cutting position. Therefore, it is possible to reliably prevent the end portion of the sheet of the first roll from being drawn into between the pressing roller and the second roll by the airflow due to the rotation of the second roll and the inertia of the first roll.

The invention claimed is:

1. A sheet supply device for supplying a sheet from a first roll and a second roll around which the sheet is wound, the sheet supply device comprising:
   a rotation member rotatably supported about a rotation shaft;
   a first support shaft that is provided on the rotation member, and configured to support the first roll at a center position thereof;
   a second support shaft that is provided on the rotation member, and configured to support the second roll at a center position thereof;
   a joining mechanism configured to join the sheet of the second roll disposed at a splice position by rotating the rotation member to the sheet of the first roll when a remaining quantity of the sheet of the first roll is equal to or less than a preset remaining quantity in a state in which the sheet of the first roll is supplied; and
   a guide roller configured to guide the sheet drawn from the first roll,
   wherein:
   the joining mechanism includes a pressing roller configured to press a middle part of the sheet between the first roll and the guide roller against a preset pressing position on an outer peripheral surface of the second roll, and a moving unit configured to support the pressing roller such that the pressing roller is configured to approach and move away from the outer peripheral surface of the second roll between a forward position where the pressing roller is pressed against the pressing position and a retracted position where the pressing roller is away from the pressing position;
   the moving unit is configured to move in a radial direction of the second roll such that a center of the pressing roller moves in a straight line passing through a center of the rotation shaft and a center of the second support shaft;
   the pressing roller is fixed to the moving unit so as to be pressed against the pressing position by moving the moving unit; and
   the guide roller is: (i) disposed on an opposite side of the second roll with respect to a tangential line to the outer peripheral surface of the second roll at the pressing position in a state in which the pressing roller is pressed against the pressing position of the second roll; (ii) configured to guide the sheet from the pressing roller in a direction away from the second roll; and (iii) fixed to the moving unit so as to be configured to approach and move away from the second roll together with the pressing roller.

2. The sheet supply device according to claim 1, wherein:
   the guide roller is a first guide roller;
   the sheet supply device further comprises a second guide roller configured to guide the sheet from the second guide roller to the pressing position in a direction approaching the second roll, the second guide roller being fixed to the moving unit so as to be configured to approach and move away from the second roll together with the pressing roller;
   the second guide roller is disposed on an opposite side to the second roll with respect to the tangential line to the outer peripheral surface of the second roll at the pressing position and on an opposite side to the first guide roller with respect to a plane including the pressing position and the center of the pressing roller in the state in which the pressing roller is pressed against the pressing position of the second roll; and
   a first angle formed by the sheet guided from the pressing position to the first guide roller and the tangential line is greater than a second angle formed by the sheet guided from the second guide roller to the pressing position and the tangential line.

3. The sheet supply device according to claim 2, further comprising:
   a cutter that is configured to cut the sheet of the first roll between the second guide roller and the pressing roller, the cutter being fixed to the moving unit,
   wherein:
   the moving unit is configured to support the pressing roller such that the center of the pressing roller and the center of the second support shaft are positioned on a same plane, and the pressing roller is movable in a horizontal direction;
   the first guide roller is disposed above the pressing roller; and
   the second guide roller and the cutter are disposed below the pressing roller.

4. The sheet supply device according to claim 3, further comprising:
   an urging mechanism that is switchable between a supply state in which a downward force is supplied to a portion positioned below the cutter on the sheet of the first roll and a stop state in which supply of the downward force is stopped; and
   a controller configured to perform control to switch the urging mechanism from the stop state to the supply state,
   wherein:
   the cutter is fixed to the moving unit in a state in which the cutter can be moved between a non-cutting position separated from the sheet and a cutting position where the sheet is cut; and
   the controller is configured to switch the urging mechanism from the stop state to the supply state in accordance with a timing when the cutter is operated to the cutting position while operating the cutter from the non-cutting position to the cutting position when the remaining quantity of the sheet of the first roll becomes equal to or less than the preset remaining quantity.

5. A sheet supply method for supplying a sheet from a first roll and a second roll around which the sheet is wound, the sheet supply method comprising:
   supplying the sheet of the first roll supported at a center position by a first support shaft that is provided on a rotation member rotatably supported about a rotation shaft, the second roll being supported at a center position by a second support shaft that is provided on the rotation member; and joining the sheet of the second roll disposed at a splice position by rotating the rotation member to the sheet of the first roll using a joining mechanism when a remaining quantity of the sheet of the first roll is equal to or less than a preset remaining quantity in a state in which the sheet of the first roll is supplied, wherein:

the joining mechanism includes a pressing roller that presses a middle part of the sheet between a guide roller for guiding the sheet drawn from the first roll and the first roll against a preset pressing position on an outer peripheral surface of the second roll, and a moving unit that supports the pressing roller such that the pressing roller is configured to approach and move away from the outer peripheral surface of the second roll between a forward position where the pressing roller is pressed against the pressing position and a retracted position where the pressing roller is away from the pressing position;

the moving unit is configured to move in a radial direction of the second roll such that a center of the pressing roller moves in a straight line passing through a center of the rotation shaft and a center of the second support shaft;

the pressing roller is fixed to the moving unit, and pressed against the pressing position by moving the moving unit; and in the joining the sheet of the second roll to the sheet of the first roll, by moving the moving unit in a direction approaching the second roll, the sheet is guided such that the sheet is guided from the pressing roller in a direction away from the second roll by pressing the pressing roller against the pressing position and disposing the guide roller which is fixed to the moving unit on an opposite side of the second roll with respect to a tangential line to the outer peripheral surface of the second roll at the pressing position.

* * * * *